United States Patent
Noda et al.

(10) Patent No.: US 7,672,215 B2
(45) Date of Patent: Mar. 2, 2010

(54) OPTICAL RECORDING MEDIUM AND RECORDING/READING METHOD THEREFOR

(75) Inventors: Yoshihiro Noda, Tokyo (JP); Shigeyuki Furomoto, Tokyo (JP)

(73) Assignee: Mitsubishi Kagaku Media Co., Ltd., Tokyo (JP)

( * ) Notice: Subject to any disclaimer, the term of this patent is extended or adjusted under 35 U.S.C. 154(b) by 1272 days.

(21) Appl. No.: 11/176,749

(22) Filed: Jul. 7, 2005

(65) Prior Publication Data

US 2005/0243699 A1  Nov. 3, 2005

Related U.S. Application Data

(63) Continuation of application No. PCT/JP2004/005215, filed on Apr. 12, 2004.

(30) Foreign Application Priority Data

Apr. 14, 2003 (JP) ............................. 2003-109486
Apr. 15, 2003 (JP) ............................. 2003-110579

(51) Int. Cl.
G11B 7/24 (2006.01)
(52) U.S. Cl. ..................... 369/275.4; 369/283; 369/288
(58) Field of Classification Search ... 369/275.1–275.5, 369/59.13, 284, 283, 288; 428/64.4, 64.8
See application file for complete search history.

(56) References Cited

U.S. PATENT DOCUMENTS

| 5,764,619 | A | 6/1998 | Nishiuchi et al. | |
|---|---|---|---|---|
| 5,863,702 | A | 1/1999 | Ohbayashi et al. | |
| 6,709,801 | B2* | 3/2004 | Miyamoto et al. | 430/270.13 |
| 6,771,587 | B2* | 8/2004 | Nishiuchi et al. | 369/283 |
| 6,835,432 | B2* | 12/2004 | Abe et al. | 428/64.1 |
| 6,856,589 | B2* | 2/2005 | Hirotsune et al. | 369/275.4 |

(Continued)

FOREIGN PATENT DOCUMENTS

EP  0 957 477  11/1999

(Continued)

OTHER PUBLICATIONS

International Search Report dated Jul. 6, 2004.

(Continued)

*Primary Examiner*—Ali Neyzari
(74) *Attorney, Agent, or Firm*—Katten Muchin Rosenman LLP

(57) ABSTRACT

In a single-sided incident type optical recording medium having a plurality of dye containing recording layers, sufficient reflectance and excellent recording characteristics necessary to record or read information in or from a dye containing recording layer positioning farther from a side from which a light beam comes in can be obtained. The optical recording medium has a first substrate (21) having a guide groove, a first dye containing recording layer (22), a semitransparent reflective layer (23), an intermediate layer (24), a second dye containing recording layer (25), a reflective layer (26) and a second substrate (27) having a guide groove. Information is recorded or read in or from the first dye containing recording layer (22) and the second dye containing recording layer (25) by irradiating the light beam from the first substrate's side. The depth of the guide groove on the second substrate is within a range from $1/100 \times \lambda$ to $1/6 \times \lambda$ where $\lambda$ represents the recording/reading wavelength.

2 Claims, 1 Drawing Sheet

U.S. PATENT DOCUMENTS

| | | | |
|---|---|---|---|
| 7,360,228 B2 | 4/2008 | Van Den Oetelaar et al. | |
| 7,371,449 B2 * | 5/2008 | Noda et al. | 428/64.1 |
| 7,427,432 B2 * | 9/2008 | Furomoto | 428/64.1 |
| 2001/0016242 A1 | 8/2001 | Miyamoto et al. | |
| 2002/0060978 A1 | 5/2002 | Hirotsune et al. | |
| 2005/0213467 A1 * | 9/2005 | Noda et al. | 369/94 |
| 2005/0226116 A1 * | 10/2005 | Kubo et al. | 369/47.53 |
| 2006/0098561 A1 * | 5/2006 | Iwasa et al. | 369/275.1 |
| 2008/0002550 A1 * | 1/2008 | Noda et al. | 369/94 |
| 2009/0022933 A1 * | 1/2009 | Furomoto et al. | 428/64.8 |

FOREIGN PATENT DOCUMENTS

| | | |
|---|---|---|
| EP | 1 067 535 | 1/2001 |
| JP | 4-10248 | 1/1992 |
| JP | 4-49540 | 2/1992 |
| JP | 10-505188 | 5/1998 |
| JP | 11-39657 | 2/1999 |
| JP | 11-66622 | 3/1999 |
| JP | 2000-311384 | 11/2000 |
| JP | 2001-23237 | 1/2001 |
| JP | 2003-99989 | 4/2003 |
| JP | 2003-303447 | 10/2003 |
| TW | 351809 | 2/1999 |
| WO | 03/107334 | 12/2003 |
| WO | 2004/021336 | 3/2004 |

OTHER PUBLICATIONS

Supplementary European Search Report dated Jun. 20, 2008, from the corresponding European Application.

Notice of Reasons for Rejection dated Jul. 22, 2008, from corresponding Japanese Application No. 2003-110579.

Notice of Reasons for Rejection dated Aug. 5, 2008, from corresponding Japanese Application No. 2004-104881.

Taiwanese Office Action dated Jul. 4, 2008, from the corresponding Taiwanese Application.

European Search Report dated Apr. 29, 2009, from the corresponding European Application.

* cited by examiner

OPTICAL RECORDING MEDIUM AND RECORDING/READING METHOD THEREFOR

CROSS-REFERENCE TO RELATED APPLICATION

This application is a continuation of International Application PCT/JP2004/005215 filed on Apr. 12, 2004, now International Publication WO 2004/093070 claims priority from Japanese Patent Applications 2003-109486 filed on Apr. 14, 2003 and 2003-110579 filed Apr. 15, 2003, the contents of which are herein wholly incorporated by reference.

TECHNICAL FIELD

The present invention relates to an optical recording medium having a plurality of recording layers in which information is recorded or read by irradiating a light beam from one side thereof such as a DVD-R or the like, a recording/reading method for the optical recording medium, and a manufacturing method of the optical recording medium.

BACKGROUND ART

Various types of optical recording media such as CD-R, CD-RW, MO and so froth are widely recognized and spread as external storages for information processing apparatuses such as computers because they can store a large volume of information and can be randomly accessed easily. With an increase in quantity of handled information, there is a demand to increase the recording density.

Among various optical recording media, optical disks having a recording layer containing an organic dye (also referred to as a dye containing recording layer) such as CD-R, DVD-R, DVD+R and the like are particularly widely used because they are relatively inexpensive and have compatibility with read-only optical disks.

Media such as CD-R representative of optical disks having the dye containing recording layer, for example, are in a laminated structure which has a dye containing recording layer and a reflective layer in order on a transparent disk substrate along with a protective layer for covering the dye containing layer and the reflective layer. Recording and reading are performed with a laser beam through the substrate.

DVD-R (single-sided, single-layer DVD-R), which is representative as well, has a laminated structure in which a dye containing recording layer, a reflective layer and a protective layer covering them are formed in this order on a first transparent disk substrate, and a so-called dummy disk, which has a second disk substrate (which may be transparent or opaque) and, if necessary, a reflective layer formed on the second disk substrate, provided on the protective layer through or not through an adhesive layer. Recording or reading are performed with a laser beam from one side of the disk through the first transparent disk substrate. The dummy disk may be of only a transparent or opaque disk substrate, or may be provided with a layer other than the reflective layer.

Meanwhile, DVD+R has almost the same structure as DVD-R, description of which will be hereinafter represented by DVD-R.

In order to largely increase the recording capacity of the optical recording medium, two single-sided DVD-Rs as above are bonded together to form a medium having two recording layers, which is known as a double-sided DVD-R (double-sided, dual-layered DVD-R). Recording and reading are performed by irradiating a laser beam onto each of the recording layers from the both sides (that is, the laser beam is irradiated from one side of the medium to perform recording and reading on a recording layer closer to this side, while the laser beam is irradiated from the other side of the medium to perform recording and reading on the other recording layer closer to the other side).

With respect to optical recoding media having a plurality of recording layers, there is, in these years, a demand for a single-sided incident type optical recording medium (for example, single-sided incident dual-layered DVD-R) on which recording and reading can be performed on a plurality of recording layers by irradiating a laser beam from one side so as to avoid an increase in size and complexity of the recording/reading apparatus, enable continuous reading from the plural recording layers, and improve the facility.

To meet the above demand, there has been proposed a single-sided incident type DVD-R of the dual layer type (single-sided, dual-layered DVD-R) having two recording layers, for example, as a single-sided incident type optical recording medium having the structure below (refer to Japanese Unexamined Patent Publication No. HEI 11-066622, for example).

For example, a single-sided incident type DVD-R of the dual layer type of the bonded type is formed by laminating, on a first light-transmissible substrate, a first recording layer made from an organic dye on which information can be optically recorded by irradiating a laser beam for recording, a first reflective layer made of a semi-light-transmissible reflective film that can pass through a part of the laser beam for reading, an intermediate layer that can pass through the laser beam for recording and the laser beam for reading, a second recording layer made from an organic dye on which information can be optically recoded by irradiating the laser beam for recording, a second reflective layer reflecting the laser beam for reading, and a second substrate in this order.

DISCLOSURE OF INVENTION

Generally, a guide groove (concave portion) is formed, spirally or concentrically, on the substrate of the optical recording medium such as a CD, DVD or the like to guide a recording light beam or a reading light beam.

Generally, the depth of the guide groove is approximately 150 nm, for example, in an optical recording medium having a dye containing recording layer (hereinafter referred to as a recording layer) such as a CD-R, DVD-R or the like.

When a material for forming a recording layer is coated on the substrate in order to make an optical recording medium having the recording layer such as a CD, DVD or the like, the film thickness of the recording layer is large at the concave portion because the recording layer is such formed as to fill the concave portion on the substrate. It is generally said that when the recording track is formed at a portion (thick film portion; concave portion) at which the film thickness is large, excellent recording/reading characteristics (for example, reflectance, maximum signal amplitude, polarity, etc.) are obtained.

The maximum signal amplitude is a value obtainedz by standardizing the signal amplitude of the longest mark/longest space (14 T mark/14 T space in a medium of the DVD system) in terms of reflectance.

For this, the recording track is formed at the thick film portion in all the commercially available optical recording media.

Meanwhile, the guide groove (concave portion) formed on the substrate is a convex portion when looked from the side from which the light beam is irradiated at the time of recording or reading. Namely, the concave portion on the substrate is a convex portion of the dye recording layer.

A single-sided incident type optical recording medium (for example, a single-sided incident type DVD-R of the dual layer type or the like) having a plurality of dye containing recording layers is under development.

For example, the single-sided incident type optical recording medium having two dye containing recording layers has a first dye containing recording layer closer to a side from which the light beam is irradiated (light irradiated side, one side), and a second dye containing recording layer farther from the same. In such the single-sided incident type optical recording medium, recording or reading of information in or from the second dye containing recording layer is performed by irradiating the light beam through the first dye containing recording layer.

In such the single-sided incident type optical recording medium, when the guide groove formed on the substrate positioning on the opposite side to the side from which the light beam comes in has a depth of approximately 150 nm like general optical recording media, there is possibility that reflectance necessary for recording or reading of information in or from the second dye containing recording layer cannot be obtained.

When the recording track is formed on the convex portion (thick film portion) of the first dye containing recording layer like commercially available optical recording media, excellent recording/reading characteristics can be obtained. However, since the conditions of the second dye containing recording medium differ from those of the first dye containing recording layer, there is possibility that more preferable recording track is different.

In the light of the above problems, an object of the present invention is to provide an optical recording medium, a recording/reading method for the optical recording medium and a manufacturing method for the optical recording medium, the optical recording medium having a plurality of dye containing recording layers, in which information is recorded or read by irradiating a light beam from one side thereof, wherein sufficient reflectance and more excellent recording/reading characteristics can be obtained when information is recorded in or read from a dye containing recording layer positioning farther from the side from which the light beam comes in, or when information is recorded in or read from a dye containing recording layer by irradiating the light beam from the opposite side to the substrate.

Therefore, the present invention provides an optical recording medium comprising at least a first substrate having a guide groove, a first dye containing recording layer, a semitransparent reflective layer, a second dye containing recording layer, a reflective layer and a second substrate having a guide groove, in which information is recorded in or read from the first dye containing recording layer and the second dye containing recording layer by irradiating a light beam from the first substrate's side, wherein a depth of the guide groove of the second substrate is within a range from $1/100 \times \lambda$ to $1/6 \times \lambda$ where $\lambda$ represents a recording/reading wavelength.

The present invention further provides an optical recording medium comprising at least a first substrate having a guide groove, a first dye containing recording layer, a semitransparent reflective layer, a second dye containing recording layer, a reflective layer and a second substrate having a guide groove, in which information is recorded in or read from the first dye containing recording layer and the second dye containing recording layer by irradiating a light beam from the first substrate's side, wherein a depth of the guide groove of the second substrate is shallower than a depth of the guide groove of the first substrate.

The present invention still further provides an optical recording medium comprising a first information recording body formed by laminating at least a first dye containing recording layer containing a first dye and a semitransparent reflective layer in this order on a first substrate having a guide groove and a second information recording body formed by laminating at least a reflective layer and a second dye containing recording layer containing a second dye in this order on a second substrate having a guide groove, the optical recording medium being formed by bonding together the first information recording body and the second information recording body through an optically transparent adhesive layer, with opposite sides to the substrates of the first information recording body and the second information recording body facing to each other, in which information is recorded or read by irradiating a light beam from the first substrate's side, wherein a depth of the guide groove of the second substrate is within a range from $1/100 \times \lambda$ to $1/6 \times \lambda$ where $\lambda$ represents a recording/reading wavelength.

The present invention still further provides an optical recording medium comprising a plurality of dye containing recording layers, in which information is recorded or read by irradiating a light beam from one side thereof, wherein a depth of a guide groove used to record or read information in or from a dye containing recording layer positioning farther from the side, from which the laser beam is irradiated, is within a range from $1/100 \times \lambda$ to $1/6 \times \lambda$ where $\lambda$ represents a recording/reading wavelength.

The present invention still further provides an optical recording medium comprising at least a dye containing recording layer, a reflective layer and a substrate having a guide groove, in which information is recorded in or read from the dye containing recording layer by irradiating a light beam from an opposite side to the substrate, wherein a depth of the guide groove of the substrate is within a range from $1/100 \times \lambda$ to $1/6 \times \lambda$ where $\lambda$ represents a recording/reading wavelength.

The present invention still further provides a recording/reading method for an optical recording medium comprising a first dye containing recording layer and a second dye containing recording layer, in which information is recorded in or read from the first dye containing recording layer and the second dye containing recording layer, which has a thick film portion and a thin film portion, by irradiating a light beam from one side thereof, the recording/reading method comprising the steps of irradiating the light beam to the thin film portion of the second dye containing recording layer through the first dye containing recording layer to record or read information in or from the second dye containing recording layer.

It is preferable that the thick film portion and the thin film portion of the second dye containing recording layer are formed correspondingly to a concave portion and a convex portion, respectively, on a substrate formed on an opposite side to the side, from which the light beam is irradiated.

It is preferable that the first dye containing recording layer has a thick film portion and a thin film portion, and the light beam is irradiated to a thick film portion of the first dye containing recording layer to record or read information in or from the first dye containing recording layer.

It is preferable that the thick film portion and the thin film portion of the first dye containing recording layer are formed correspondingly to a concave portion and a convex portion, respectively, on a substrate formed on the side, from which the light beam is irradiated.

The present invention still further provides an optical recording medium comprising a first information recording body formed by laminating at least a first dye containing recording layer containing a first dye and a semitransparent reflective layer in this order on a first substrate having a guide groove and a second information recording body formed by laminating at least a reflective layer and a second dye containing recording layer containing a second dye in this order on a second substrate having a guide groove, the optical recording medium being formed by bonding together the first information recording body and the second information recording body through an optically transparent adhesive layer, with opposite sides to the substrates of the first information recording body and the second information recording body facing to each other, in which information is recorded or read by irradiating a light beam from the first substrate's side, wherein the second dye containing recording layer has a thick film portion and a thin film portion, and the light beam is irradiated to the thin film portion of the second dye containing recording layer to record or read information in or from the thin film portion.

The present invention still further provides an optical recording medium comprising a plurality of dye containing recording layers, in which information is recorded or read by irradiating a light beam from one side thereof, wherein a dye containing recording layer positioning farther from the side, from which the light beam is irradiated, has a thick film portion and a thin film portion, and the light beam is irradiated to the thin film portion thereof to record or read information in or from the thin film portion.

The present invention still further provides an optical recording medium manufacturing method for manufacturing the above optical recording medium comprising the steps of forming a guide groove on the second substrate or the substrate with a negative stamper.

According to the optical recording medium, the recording/reading method for the optical recording medium and the manufacturing method for the optical recording medium of this invention, it is possible to attain sufficient reflectance and more excellent recording/reading characteristics in an optical recording medium having a plurality of dye containing recording layers, in which information is recorded or read by irradiating a light beam from one side thereof, when information is recorded in or read from a dye containing recording layer positioning farther from the side, from which the light beam comes in. When information is recorded in or read from a dye containing recording layer by irradiating the light beam from the opposite side to the substrate, it is possible to attain sufficient reflectance and more excellent recording/reading characteristics.

BEST MODE FOR CARRYING OUT THE INVENTION

Hereinafter, description will be made of an example of an optical recording medium (write-once optical recording medium), a recording/reading method for the optical recording medium, and a manufacturing method for the optical recording medium according to an embodiment of this invention with reference to FIGS. 1 and 2.

(1) Structure of Optical Recording Medium

An optical recording medium according to this invention is a single-sided incident type optical recording medium having a plurality of recording layers, in or from which information can be recorded or read by irradiating a laser beam from one side thereof.

The optical recording medium according to this invention will be explained by way of a single-sided incident type DVD-R of the dual layer type having two recording layers (single-sided, dual-layered DVD-R, single-sided dual-layered DVD-Recordable disk) as a single-sided incident type optical recording medium of the bonded type (single-sided incident type DVD-R).

Figure 1:
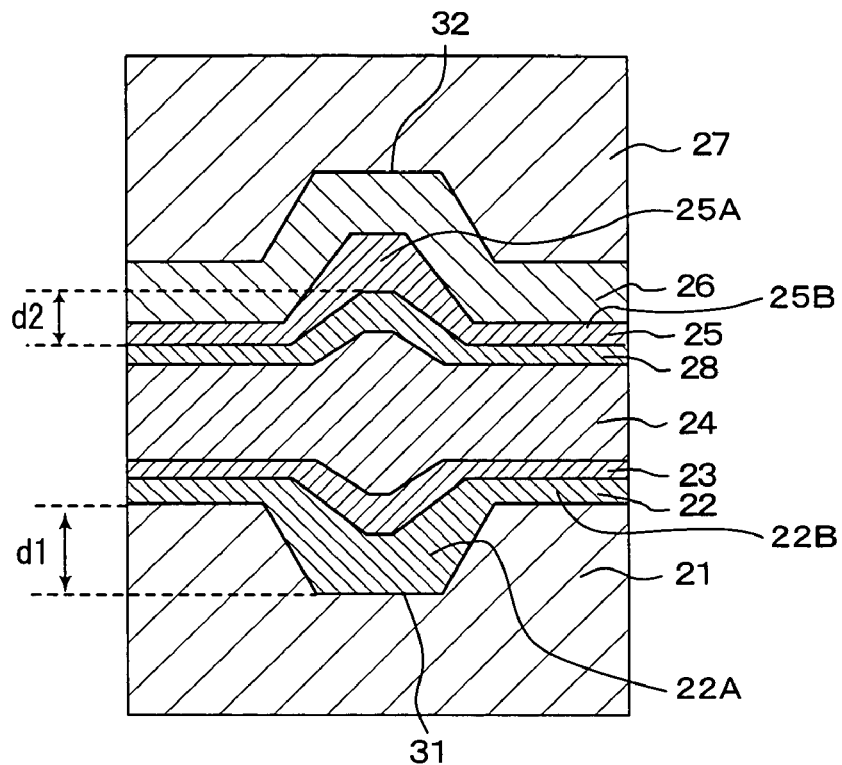
FIG. 1 is a schematic diagram showing the whole structure of an optical recording medium according to an embodiment of this invention.

FIG. 1 is a schematic sectional view showing an optical recording medium (optical disk) according to this embodiment.

The optical recording medium according to this invention has, as shown in FIG. 1, a first recording layer (first dye containing recording layer) 22 containing a dye, a semitransparent reflective layer (hereinafter referred to as a semitransparent reflective layer) 23, a transparent adhesive layer (intermediate layer) 24, a buffer layer 28, a second recording layer containing a dye (second dye containing recording layer) 25, a reflective layer 26, a disk-shaped second substrate 27 in this order on a disk-shaped transparent (light-transmissible) first substrate (first light-transmissible substrate) 21. Optical beams are irradiated from the side of the first substrate 21 to perform recording and reading.

The optical recording medium according to this invention has a first information recording body formed by laminating at least the first dye containing recording layer 23 containing a first dye and the semitransparent reflective layer 13 in this order on the first substrate 21 having a guide groove, and a second information recording body formed by laminating at least the reflective layer 26 and the second dye containing recording layer 25 containing a second dye in this order on the second substrate 27 having a guide groove. The first information recording body and the second information recording body are bonded together through an optically transparent adhesive layer, with the opposite surfaces to the substrates of the first information recording body and the second information recording body facing to each other.

In the optical recording medium according to this invention, "transparent (light-transmissible)" signifies "transparent (light-transmissible) to optical beams used for recording and reading information in and from the optical recording medium." Transparent (light-transmissible) layers include a layer which absorbs more or less the optical beams used for recording and reading. For example, when the layer has a transmittance of not less than 50 percent (preferably not less than 60 percent) to the wavelength of an optical beam used for recording or reading, the layer is considered to be light-transmissible (transparent).

Next, each of the layers will be described.

(a) With Respect to First Substrate 21

It is desirable that the first substrate 21 has excellent optical characteristics, that is, the first substrate 21 is transparent, has small birefringence, and so forth. The reflectance (the reflectance to the wavelength of the recording beam or reading beam) of the first substrate 21 is generally not less than 1.40, preferably not less than 1.45, generally not greater than 1.70, and preferably not greater than 1.65. It is also desirable that the first substrate 21 has excellent molding properties, that is, the first substrate 21 can be readily formed in injection molding. When the first substrate 21 has small hygroscopicity, such property is desirable because the warping can be decreased.

Further, it is desirable that the first substrate 21 has shape stability so that the optical recording medium has some degree of rigidity. When the second substrate 27 has sufficient shape stability, the first substrate 21 is not always required to have large shape stability.

As such material, it is possible to use resins such as acrylic resins, methacrylic resins, polycarbonate resin, polyolefin resins (particularly, amorphous polyolefin), polyester resins, polystyrene resin, epoxy resin, and so forth, and glass. Alternatively, the first substrate 21 may be comprised of a plurality of layers. For example, it is possible to provide a resin layer made from a radiation-setting resin such as a photo-setting resin or the like on the substrate made from glass, resin, or the like.

Meanwhile, polycarbonate is preferable from the viewpoint of optical properties, high productivity such a molding properties and the like, cost, low hygroscopicity, shape stability, etc. From the viewpoint of chemical resistance, low hygroscopicity and the like, amorphous polyolefin is preferable. From the viewpoint of high-speed responsibility and the like, a glass substrate is preferable.

The first substrate 21 is preferably thin. It is preferable that the first substrate 21 has a thickness of not greater than 2 mm, more preferably not greater than 1 mm. The smaller the distance between the objective lens and the recording layer and the thinner the substrate, the smaller is coma aberration, which is advantageous to increase the recording density. To obtain sufficient optical properties, hygroscopicity, molding properties and shape stability, some degree of thickness is required. It is thus preferable that the thickness of the first substrate 21 is generally not less than 10 µm, more preferably not less than 30 µm.

In order to well perform recording and reading on both of the first recording layer 22 and the second recording layer 25 in this optical recording medium of this invention, it is desirable to suitably adjust the distance between the objective lends and the both recording layers. For example, it is preferable to set the focus of the objective lends at an almost intermediate point between the both recording layers because accesses to the both layers become easy.

More concretely, in a DVD-ROM or DVD-R system, the distance between the objective lens and the recording layer is adjusted to be most suitable when the thickness of the substrate is 0.6 mm.

When this layer structure is compatible with DVD-ROM, it is most preferable that the first substrate 21 has a thickness obtained by subtracting a half of the film thickness of the transparent adhesive layer 24 as being the intermediate layer from 0.6 mm. If so, the approximately intermediate point between the both layers is approximately 0.6 mm, thus the focusing servo control can be readily performed on the both recording layers.

When another layer such as a buffer layer, a protective layer or the like exists between the second recording layer 25 and the semitransparent reflective layer 23, it is most preferable that the first substrate 21 has a thickness obtained by subtracting a half of a sum of the thicknesses of that layer and the transparent adhesive layer 24 from 0.6 mm.

A groove (guide groove) 31 used to guide a recording/reading light (recording/reading beam; for example, a laser beam) for recording or reading information is formed, spirally or concentrically, on the first substrate 21. When the groove 31 is formed on the substrate 21 as this, a concave portion and a convex portion are formed on the surface of the substrate 21. The concave portion (groove) of the irregularities is called a groove, whereas the convex portion is called a land. The groove or land is used as a recording track to record or read information in or from the first recording layer 22. Incidentally, the groove 31 on the first substrate 21 is the convex portion with respect to the direction in which the beam is irradiated.

In the case of a so-called DVD-R disk on which recording and reading are performed by condensing a laser beam having a wavelength of 650 nm with an objective lens having a numerical aperture of 0.6 to 0.65, for example, the first recording layer 22 is generally formed in coating on the first substrate 21 so as to have a larger film thickness at the groove (concave portion) on the first substrate 21, which is suitable for recording or reading. It is thus preferable that the groove is used as the recording track.

The depth (groove depth; the height of the convex portion of the first dye containing recording layer) of the groove 31 formed on the first substrate 21 is preferably not less than $1/10 \times \lambda$ where $\lambda$ represents the recording/reading wavelength because reflectance can be sufficiently secured. The depth of the groove 31 is more preferably not less than $1/8 \times \lambda$, still more preferably not less than $1/6 \times \lambda$. When the wavelength of the recording/reading beam (recording/reading wavelength) is $\lambda=650$ nm, for example, the depth of the groove 31 on the first substrate 21 is preferably not less than 65 nm, more preferably not less than 81 nm, still more preferably not less than 108 nm.

It is preferable that the depth of the groove 31 on the first substrate 21 is preferably not greater than $2/4 \times \lambda$ because the transferability of the shape of the groove is improved. More preferably, the depth of the groove 31 is not greater than $2/5 \times \lambda$, and still more preferably, not greater than $2/6 \times \lambda$. When the recording/reading wavelength is $\lambda=650$ nm, for example, the depth of the groove 31 on the first substrate 21 is preferably not greater than 325 nm, more preferably not greater than 260 nm, still more preferably not greater than 217 nm.

It is preferable that the width (groove width, G width; width of the convex portion of the first dye containing recording layer; half width) of the groove 31 on the first substrate 21 is not less than $1/10 \times T$ where T represents the track pitch because sufficient reflectance can be secured. More preferably, the width of the groove 31 is not less than $2/10 \times T$, still more preferably, not less than $3/10 \times T$. When the track pitch is 740 nm, for example, the width of the groove 31 on the first substrate 21 is preferably not less than 74 nm, more preferably not less than 148 nm, still more preferably not less than 222 nm.

It is preferable that the width of the groove 31 on the first substrate 21 is not greater than $9/10 \times T$ because excellent transferability of the shape of the groove can be obtained. The width of the groove 31 is more preferably not greater than $8/10 \times T$, still more preferably not greater than $7/10 \times T$. When the track pitch is 740 nm, for example, the width of the groove 31 on the first substrate 21 is preferably not greater than 666 nm, more preferably not greater than 592 nm, still more preferably not greater than 518 nm.

In the case of the groove recording, the groove 31 on the first substrate 21 is made slightly snake in the radial direction at a predetermined amplitude and a predetermined frequency to form wobble. In the land between the grooves 31 on the first substrate 21, isolated pits (address pits) are formed in a certain rule (this called Land Pre-Pit; LPP). The address information may be beforehand recorded with the Land Pre-Pits. Other concave/convex pits (pre-pits) may be formed as required.

From the viewpoint of cost, it is preferable to manufacture the substrate having such a concave portion and a convex portion in injection molding with a stamper having a concave portion and a convex portion. When a resin layer made from a radiation-setting resin such as a photo-setting resin or the like is formed on the substrate made from glass or the like, irregularities such as a recording track and the like may be formed on the resin layer.

(b) With Respect to First Recording Layer 22

Generally, the sensitivity of the first recording layer 22 is almost equivalent to that of the recording layer used in a single-sided recording medium (for example, CD-R, DVD-R, DVD+R) or the like.

In order to realize excellent recording/reading characteristics, it is preferable that the first recording layer 22 contains a low-exothermatic dye which is lowly exothermatic and has high refractive index.

The refractive index (refractive index to the wavelength of the recording beam or reading beam) of the dye used in the first recording layer 22 is generally not less than 1.00, preferably not less than 1.50, and generally not greater than 3.00.

The extinction coefficient (extinction coefficient to the wavelength of the recording beam or reading beam) of the dye used in the first recording layer 22 is generally not greater than 0.50, preferably not greater than 0.30. When the extinction coefficient is excessively large, absorption by the dye containing recording layer becomes excessively large, which causes a decrease in reflectance. However, absorption to some extent is preferable for the sake of recording. Thus, the extinction coefficient is generally not less than 0.001 although there is particularly no lower limitation.

Further, a combination of the first recording layer 22 and the semitransparent reflective layer 23 is preferably within appropriate ranges of the reflection, transmission and absorption of the light, whereby the recording sensitivity is improved and the thermal interference during recording is decreased.

As such organic dye material, there are macrocyclic azaan-nulene dyes (phtalocyanine dyes, naphtalocyanine dyes, porphyrin dyes, etc.), pyrromethene dyes, polymethine dyes, (cyanine dyes, merocyanine dyes, squalirium dyes, etc.) anthoraquinone dyes, azulenium dyes, metal complex azo dyes, metal complex indoaniline dyes, etc.

Among the above various organic dyes, metal complex azo type dyes are preferable because they have excellent recording sensitivity, durability and light resistance. Particularly, a compound represented by the following general formula (I) or (II) is preferable:

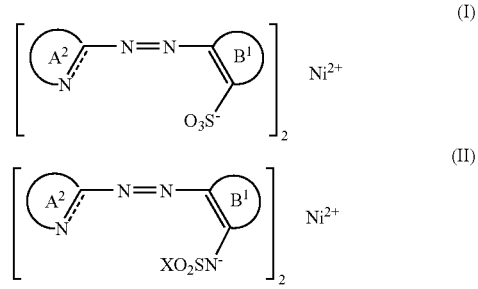

(where rings $A^1$ and $A^2$ are nitrogen-containing aromatic heterocycles, each of which can independently have a substituent; rings $B^1$ and $B^2$ are aromatic rings, each of which can independently have a substituent; and X is an alkyl group having carbon number 1 to 6 substituted with at least two fluorine atoms).

An organic dye used in the recording layer of the optical recording medium according to this invention preferably is a dye compound which has the maximum absorption wavelength λ max within a range from the visible rays to the near infrared rays of approximately 350 to 900 nm, and is suited to recording with a laser of blue to near microwave. More preferable is a dye suited to recording with a near infrared laser at a wavelength from about 770 to 830 nm (typically at 780 nm, 830 nm, etc.) used generally for CD-R, a red laser at a wavelength of about 620 to 690 nm (typically at 635 nm, 650 nm, 680 nm, etc.) used for DVD-R, or a so-called blue laser at a wavelength of about 340 to 530 nm (typically at 410 nm or 515 nm, etc.).

It is possible to use one kind of dye, or mix two or more the same or different kinds of dyes and use them. Further, it is possible to use together dyes suited for recording with a recording beam at a plurality of wavelengths to realize an optical recording medium coping with recording with a laser beam in a plurality of wavelength bands.

The first recording layer 22 may contain a transition metal chelate compound (for example, acetylacetonato chelate, bisphenyldithiol, salicylaldehyde oxime, bisdithio-α-diketone or the like) as a singlet oxygen quencher in order to stabilize the recording layer or improve the light resistance, or a recording sensitivity improving agent such as a metal system compound or the like in order to improve the recording sensitivity. Here, the metal system compound is that a metal such as a transition metal or the like in the form of atom, ion, cluster or the like is contained in a compound. As such metal system compound, there are, for example, organometallic compounds such as ethylenediamine complexes, azomethine complexes, phenylhydroxyamine complexes, phenanthroline complexes, dihydroxyazobenzene complexes, dioxime complexes, nitrosoaminophenol complexes, phyridyltriazine complexes, acetylacetonato complexes, metallocene complexes, porphyrin complexes, and the like. There is no limitation with respect to the metal atom, but a transition metal is preferable.

Further, a binder, a leveling agent, an antiforming agent and the like may be together used to make the first recording layer 22 of the optical recording medium according to this invention as required. As a preferable binder, there are poly (vinyl alcohol), poly(vinyl pyrrolidone), nitrocellulose, cellulose acetate, ketone resins, acrylic resins, polystyrene resins, urethane resins, poly(vinyl butyral), polycarbonate, polyolefin, etc.

The film thickness of the first recording layer 22 is not specifically limited because the suited film thickness differs according to the recording method or the like. However, in order to obtain sufficient modulation amplitude, the film thickness is preferably not less than 5 nm, more preferably not less than 10 nm, and specifically preferably not less than 20 nm, in general. However, the recording layer is required not to be excessively thick in order to appropriately pass through the light in the optical recording medium of this invention. Accordingly, the film thickness of the recording layer is generally not greater than 3 μm, preferably not greater than 1 μm, and more preferably not greater than 200 nm. The film thickness of the first recording layer 22 differs from the groove to the land. In the optical recording medium of this invention, the film thickness of the first recording layer 22 is at the groove on the substrate.

As the method of deposition of the first recording layer 22, there can be applied a thin film deposition generally performed such as vacuum evaporation, sputtering method, doctor blade method, cast method, spin coating, dipping method or the like. From the standpoint of productivity and cost, spin coating is preferable. Vacuum evaporation is more preferable than coating method because it can yield a recording layer having uniform thickness.

When the deposition is performed in spin coating, the rotation speed is preferably 10 to 15000 rmp. After the spin coating, a process of annealing or applying solvent vapor or the like may be performed.

As a coating solvent used when the first recording layer 22 is formed in a coating method such as doctor blade method, cast method, spin coating, dipping method or the like, the type of solvent is not limited, thus any solvent can be used so long as it does not attack the substrate. For example, there are ketone alcohol type solvents such as diaceton alcohol, 3-hydroxy-3-methyl-2-butanone and the like, cellosolve type solvents such as methyl cellosolve, ethyl cellosolve and the like, chain hydrocarbon type solvents suh as n-hexane, n-octane and the like, ring hydrocarbon type solvents such as cyclohexane, methylcyclohexane, ethylcyclohexane, dimethylcyclohexane, n-butylcyclohexane, tert-butylcyclohexane, cyclooctane and the like, perfluoroalkylalcohol type solvents such as tetrafluoropropanol, octafluoropentanol, hexafluorobutanol and the like, hydroxy carboxylic acid ester type solvents such as methyl lactate, ethyl lactate, methyl 2-hydroxyisobutyric acid and the like, etc.

In the case of vacuum evaporation, recording layer compounds such as an organic dye and various additives and the like as required are put in a crucible disposed inside a vacuum chamber, for example, the inside of the vacuum chamber is evacuated to about $10^{-2}$ to $10^{-5}$ Pa by an appropriate vacuum pump, after that, the crucible is heated to vaporize the recording layer components, and the recording layer components are deposited on the substrate placed opposite to the crucible, whereby the first recording layer 22 is formed.

(c) With Respect To Semitransparent Reflective Layer 23

The semitransparent reflective layer 23 is a reflective layer having some degree of light transmittance. Namely, the semitransparent reflective layer 23 is a reflective layer which has small absorption (absorption of recording/reading beam), a light transmittance of not less than 40 percent, and appropriate light reflectance (of not less than 30 percent, in general). For example, by providing a thin metal film having high reflectance, it is possible to give appropriate transmittance. It is desirable that the semitransparent reflective layer 23 has some degree of corrosion resistance. Further, it is desirable that the semitransparent reflective layer 23 has shutting-off properties so that the first recording layer 22 is not affected by leaking of the upper layer (here the transparent adhesive layer 24) of the semitransparent reflective layer 23.

To secure high transmittance, the thickness of the semitransparent reflective layer 23 is preferably not greater than 50 nm, in general. The thickness of the semitransparent reflective layer 23 is more preferably not greater than 30 nm, and still more preferably not greater than 25 nm. However, the semitransparent reflective layer 23 is required to be thick to some degree in order to avoid an effect of the upper layer of the semitransparent reflective layer 23 on the first recording layer 22. Thus, the thickness of the semitransparent reflective layer 23 is generally not less than 3 nm, and more preferably not less than 5 nm.

As the material of the semitransparent reflective layer 23, it is possible to use, solely or in the form of alloy, metals and semimetals such as Au, Al, Ag, Cu, Ti, Cr, Ni, Pt, Ta, Pd, Mg, Se, Hf, V, Nb, Ru, W, Mn, Re, Fe, Co, Rh, Ir, Zn, Cd, Ga, In, Si, Ge, Te, Pb, Po, Sn, Bi and rare earth metals, which have appropriately high reflectance at the wavelength of the reading beam. Among them, Au, Al and Ag have high reflectance, thus are suitable as the material of the semitransparent reflective layer 23. The semitransparent reflective layer 23 may contain other component than the above as being the main component.

A material containing Ag as the main component is particularly preferable because of its low cost and high reflectance. Here, the main component signifies a material contained not less than 50 percent.

Since the semitransparent reflective layer 23 has thin film thickness, large crystal grains of the film cause reading noise. Thus, it is preferable to use a material having small crystal grains. Since pure silver tends to have large crystal grains, it is preferable to use Ag as in the form of alloy.

Particularly, it is preferable to contain Ag as the main component, and 0.1 to 15 atomic percent of at least one element selected from the group consisting of Ti, Zn, Cu, Pd, Au and rare earth metals. When two or more of Ti, Zn, Cu, Pd, Au and rare earth metals are contained, each of these may be 0.5 to 15 atomic percent. However, the sum of these is preferably 0.1 to 15 atomic percent.

A particularly preferable alloy composition is one that contains Ag as the main component, 0.1 to 1.5 atomic percent of at least one element selected from the group consisting of Ti, Zn, Cu, Pd and Au, and 0.1 to 15 atomic percent of at least one rare earth metal. Among the rare earth metals, neodymium is particularly preferable. In more concrete, AgPdCu, AgCuAu, AgCuAuNd, AgCuNd, etc. are preferable.

As the semitransparent reflective layer 23, a layer made from only Au is preferable because it has small crystal grains and corrosion resistance, but it is more expensive than an Ag alloy.

Alternatively, it is possible to use a layer made from Si as the semitransparent reflective layer 23.

It is possible to stack, one on the other, a thin film having low reflectance and a thin film having high reflectance both made from materials other than metals to form multi-layers, and use them as the reflective layer.

As a method for forming the semitransparent reflective layer 23, there can be applied, for example, sputtering, ion plating, chemical evaporation, vacuum evaporation, etc. It is possible to provide an inorganic or organic intermediate layer and an adhesive layer between the first substrate 21 and the semitransparent reflective layer 23 in order to improve the reflectance, the recording characteristics and the adhesive properties. For example, it is possible that an intermediate layer (or an adhesive layer), the first recording layer 22, and an intermediate layer (or an adhesive layer) and the semitransparent reflective layer 23 are stacked in this order on the first substrate 21 to provide the intermediate layer (or the adhesive layer) between the first substrate 21 and the first recording layer 22, and to provide the intermediate layer (or the adhesive layer) between the first recording layer 22 and the semitransparent reflective layer 23.

(d) With Respect to Transparent Adhesive Layer 24

The adhesive layer 24 is required to be transparent. High adhesion and small shrinkage of the adhesive layer 24 at the time that the layer is hardened and adhered brings stability of the shape of the medium, which is preferable.

The refractive index (refractive index to the wavelength of the recording beam or reading beam) of the transparent adhesive layer 24 is generally not less than 1.40, preferably not less than 1.45, generally not greater than 1.70, preferably not greater than 1.65.

It is desirable that the transparent adhesive layer 24 is made from a material that does not damage the second recording layer 25. The transparent adhesive layer 24 is easily compatible with the second recording layer 25 because the transparent adhesive layer 24 is generally made from a resin. For this, it is desirable to provide a buffer layer 28 to be described later between the transparent adhesive layer 24 and the second recording layer 25 in order to prevent the transparent adhesive layer 24 from dissolving the second recording layer 25 and from giving damage thereto.

Further, it is desirable that the transparent adhesive layer 24 is made from a material that does not damage the semitransparent reflective layer 23. It is possible to provide a known inorganic or organic buffer layer between the both layers in order to avoid the damage.

In the optical recording medium of this invention, it is preferable to accurately control the film thickness of the transparent adhesive layer 24. The film thickness of the transparent adhesive layer 24 is preferably not less than 5 μm, in general. It is necessary to provide a certain degree of distance between the two recording layers in order to perform the focusing servo control separately on the two recording layers. The film thickness of the transparent adhesive layer 24 is required to be generally not less than 5 μm, and preferably not less than 10 μm although it depends on the focusing servo mechanism.

Generally, the distance between the two recoding layers can be smaller as the objective lends has a larger numerical aperture. However, when the transparent adhesive layer 24 is excessively thick, it takes long time to adjust the focusing servo to the two recording layers and the objective lends has to be moved for a long distance, which is thus undesirable. Further, an excessively thick layer requires a long time to harden, which leads to a decrease in productively. Accordingly, the film thickness of the transparent adhesive layer 24 is preferably not greater than 100 μm.

As the material of the transparent adhesive layer 24, available are thermoplastic resins, thermosetting resins, electron beam setting resins, ultraviolet ray-curable resins (including retarded delayed curable type), etc., for example.

The transparent adhesive layer 24 can be formed by dissolving a thermoplastic resin, thermosetting resin or the like in an appropriate solvent to prepare a coating liquid, applying the liquid, and drying (heating) the liquid. In the case of a ultraviolet-curable resin, the transparent adhesive layer 24 can be formed by dissolving the resin as it is or dissolving the resin in an appropriate solvent to prepare a coating liquid, coating the coating liquid, and radiating ultraviolet rays to harden the resin. There are various types of ultraviolet ray-curable resins. However, any one of them can be used so long as it is transparent. One of these materials can be used or some of them can be mixed together to be used. Not only single layer but also multiple layers are applicable.

As the coating method, a coating method such as spin coating, cast method or the like is applicable, like the recording layer. Among them, spin coating is preferable. A resin having high viscosity can be coated in screen printing or the like. Use of a ultraviolet ray-curable resin that liquidizes at the temperature of 20 to 40° C. is preferable because no solvent is necessary to coat the resin. It is preferable to prepare the resin so that the resin has a viscosity of 20 to 1000 mPa·s.

Incidentally, it is possible to use a pressure sensitive double-sided tape, and put the tape between the laminated structures and press it to form the adhesive layer.

As the ultraviolet ray-curable adhesives, there are radical type ultraviolet ray-curable adhesives and cation type ultraviolet ray-curable adhesives, both of which are usable.

As the radical type ultraviolet-curable adhesives, all the known compositions are available. A composition containing an ultraviolet ray-curable compound and a photopolymerization initiator as essential ingredients is used. As the ultraviolet ray-curable compound, monofunctional (meta)acrylate or multifunctional (meta) acrylate is available as a polymeric monomer ingredient. These can be used solely, or two or more kinds of them can be used together. In this invention, acrylate and metaacrylate will be together referred to as (meta)acrylate.

For example, the followings are the polymeric monomers that can be used for this optical recording medium. As monofunctional (meta)acrylate, there is, for example, (meta)acrylate or the like having, as the substituent, a group of methyl, ethyl, propyl, butyl, amyl, 2-ethylhexyl, octyl, nonyl, dodecyl, hexadecyl, octadecyl, cyclohexyl, benzyl, methoxyethyl, butoxyethyl, phenoxyethyl, nonylphenoxyethyl, tetrahydrofurfuryl, glycidyl, 2-hydroxyethyl, 2-hydroxypropyl, 3-chloro-2-hydroxypropyl, dimethylaminoethyl, diethylaminoethyl, nonylphenoxyethyltetrahydrofurfuryl, caprolactone denaturated tetrahydrofurfuryl, isobornyl, dicyclopentanyl, dicyclopentenyl, dicyclopentenyloxyethyl, or the like.

As the multifunctional (meta)acrylates, there are di(meta)acrylates of 1,3-butylenegycol, 1,4-butanediol, 1,5-pentanediol, 3-methyl-1,5-pentanediol, 1,6-hexanediol, neopentyl glycol, 1,8-octanediol, 1,9-nonanediol, tricyrodecandimethanol, ethylene glycol, polyethylene glycol, propylene glycol, dipropylene glycol, tripropylene glycol, polypropylene glycol and the like, di(meta)acrylate of tris(2-hydroxyethyl)isocyanurate, di (meta) acrylate of diole obtained by adding 4 or more moles of ethylene oxide or propylene oxide to 1 mole of neopentyl glycol, di(meta)acrylate of diole obtained by adding 2 moles of ethylene oxide or propylene oxide to 1 mole of bisphenol A, di or tri(meta)acrylate of triol obtained by adding 3 or more moles of ethylene oxide or propylene oxide to 1 mole of trimethylolpropane, di(meta)acrylate of diol obtained by adding 4 or more moles of ethylene oxide or propylene oxide to 1 mole of bisphenol A, trimethylolpropanetri(meta)acrylate, pentaerythritoltri(meta)acrylate, poly(meta)acrylate of dipentaerythritol, ethylene oxide denaturated phospholic acid (meta)acrylate, ethylene oxide denaturated alkylated phospholic acid (meta)acrylate, etc.

One that can be used together with polymetic monomer is polyester (meta)acrylate, polyether (meta)acrylate, epoxy (meta)acrylate, urethane (meta)acrylate or the like, as polymeric oligomer.

As a photopolymerization initiator used for the optical recording medium of this invention, any one of the known initiators that can harden a used ultraviolet ray-curable compound represented by polymeric oligomer and/or polymeric monomer can be used. As the optical polymerization initiator, the molecular fission type or the hydrogen abstraction type is suitable.

As such photopolymerization initiator, suitably used are bensoin isobutyl ether, 2,4-diethylthioxanthone, 2-isopropylthioxanthone, benzyl, 2,4,6-trimethylbenzoyldiphenylphosphineoxide, 2-benzyl-2-dimethylamino-1-(4-morpholinophenyl)-butane-1-one, bis(2,6-dimethoxybenzoyl)-2,4,4- trimethylpenthylphosphi noxide, etc. As the molecular fission type other than these, 1-hydroxycyclohexylphenylketone, benzoinethylether, benzyldimethylketal, 2-hydroxy-2-methyl-1-phenylpropane-1-one, 1-(4-isopropylphenyl)-2-hydroxy-2-methylpropane-1-one, 2-methyl-1-(4-methylthiophenyl)-2-morphorinopropane-1-o ne, and the like can be together used. Further, benzophenone, 4-phenylbenzophenon, isophthalphenone, 4-benzoyl-4'-methyl-diphenylsulfide or the like, which are photopolymerization initiator of the molecular abstraction type, can be together used.

As the sensitizer to the photopolymerization initiator, amine that does not cause the addition reaction with the above polymeric component, such as trimethylamine, methyldimethanolamine, triethanolamine, p-diethylaminoacetophenone, p-dimethylaminoethylbenzoate, p-dimethylaminoisoamylbenzoate, N,N-dimethylbenzylamine, 4,4'-bis (diethylamino)benzophenone or the like can be together used. It is preferable to select and use one of the above photopolymerization initiators and sensitizers which has excellent solubility to the ultraviolet ray-curable compound and does not hinder the ultraviolet ray transmissivity.

As the cation type ultraviolet ray-curable adhesive, all the known compositions can be used. Epoxy resins containing a photopolymerization initiator of the cation polymerization type correspond to this. As photo initiators of the cation polymerization type, there are sulfonium salts, iodonium salts, diazonium salts, etc.

As examples of iodonium salts, there are diphenyliodonium hexafluorophosphate, diphenyliodonium hexafluoroantimonate, diphenyliodonium tetrafluoroborate, diphenyliodonium tetrakis(pentafluorophenyl) borate, bis(dodecylphenyl)iodonium hexafluorophosphate, bis(dodecylphenyl)iodonium hexafluoroantimonate, bis(dodecylphenyl)iodonium tetrafluoroborate, bis(dodecylphenyl)iodonium tetrakis(pentafluorophenyl) borate, 4-methylphenyl-4-(1-methylethyl)phenyliodonium hexafluorophosphate, 4-methylphenyl-4-(1-methylethyl) phenyliodonium hexafluoroantimonate, 4-methylphenyl-4-(1-methylethyl)phenyliodonium tetrafluoroborate, 4-methylphenyl-4-(1-methylethyl)phenyliodonium tetrakis (penthafluorophenyl)borate, etc.

As the epoxy resin, any one of bisphenol A-epichlorohydrin type, alicylic epoxy, long-chain aliphatic type, brominated epoxy resin, glycidyl ester type, glycidyl ether type, heterocyclic system, etc. is available.

As the epoxy resin, it is preferable to use one that has small contents of liberated free chlorine and chlorine ions in order to avoid the resin from damaging the reflective layer. The quantity of chlorine is preferably not greater than 1 wt %, and more preferably not greater than 0.5 wt %.

A rate of the cation polymerization type photo-initiator to 100 parts by weight of the cation type ultraviolet ray-curable resin is generally 0.1 to 20 parts by weight, and preferably 0.2 to 5 parts by weight. In order to use more effectively the wavelengths in the near infrared ray region or the visible radiation region in the wavelength band of the ultraviolet ray source, it is possible to use together a known optical sensitizer. As such optical sensitizer, there are anthracene, phenotiazine, benzylmethylketal, benzophenone, acetophenone, etc.

In order to improve various properties of the ultraviolet ray-curable adhesive, it is possible to add, as other additives, a thermal polymerization hinibitor, an antioxidant represented by hindered phenol, hindered amine, phosphite, etc., a plasticizer, a silane coupling agent represented by epoxysilane, mercaptosilane, (meta)acrylsilane, etc., as required. Among them, one that has excellent solubility to the ultraviolet ray-curable compound and does not hinder the ultraviolet ray transmissiveness is selected and used.

(e) With Respect to Second Recording Layer 25

The second recording layer 25 generally has higher sensitivity than a recording layer used for a single-sided recording medium (for example, CD-R, DVD-R, DVD+R) and the like. In this optical recording medium, since the power of an incident optical beam is decreased due to presence of the first recording layer 22, the semitransparent reflective layer 23 and the like, recording is performed with an approximate half of the power. Accordingly, the second recording layer 25 is required to have specifically high sensitivity.

For the purpose of realization of excellent recording/reading characteristics, it is desirable that the dye develops a little heat and has large refractive index.

The refractive index (refractive index to the wavelength of the recording beam or reading beam) of the dye used in the second recording layer 25 is generally not less than 1.00, preferably not less than 1.50, and generally not greater than 3.00.

The extinction coefficient (extinction coefficient to the wavelength of the recording beam or reading beam) of the dye used in the second recording layer 25 is generally not greater than 0.50, preferably not greater than 0.30. When the extinction coefficient is excessively large, absorption by the dye recording layer becomes excessively large, which causes a decrease in reflectance. Absorption to some extent is preferable for recording, thus the extinction coefficient is generally not less than 0.001 although there is no lower limitation.

Further, it is desirable that a combination of the second recording layer 25 and the reflective layer 26 provides appropriate ranges of reflection and absorption of the light beam. Whereby, the recording sensitivity can be increased and the thermal interference at the time of recording can be diminished.

The materials and deposition method of the second recording layer 25 are almost the same as the first recording layer 22, thus only the differences between them will be hereinafter described.

The film thickness of the second recording layer 25 is not specifically limited because the suitable film thickness differs according to the recording method, etc. In order to obtain sufficient modulation amplitude, the film thickness of the second recording layer 25 is preferably not less than 10 nm in general, more preferably not less than 30 nm, and particularly preferably not less than 50 nm. However, the film is required not to be excessively thick in order to obtain appropriate reflectance, thus the film thickness is generally not greater than 3 μm, preferably not greater than 1 μm, and more preferably not larger than 200 nm. Here, the film thickness of the second recording layer 25 is generally a film thickness at the thick film portion.

The materials used for the first recording layer 22 and the second recording layer 25 may be the same or may differ from each other.

(f) With Respect to Reflective Layer 26

The reflective layer 26 is required to have high reflectance. It is desirable that the reflective layer 26 is highly durable.

In order to secure high reflectance, the thickness of the reflective layer 26 is preferably not less than 20 nm, in general, more preferably not less than 30 nm, and still more preferably not less than 50 nm. In order to shorten the tact time of the production and decrease the cost, it is preferable that the reflective layer 26 is thin to some degree. Accordingly, the film thickness is generally not greater than 400 nm, and more preferably not greater than 300 nm.

As the material of the reflective layer 26, it is possible to use, solely or in a form of alloy, metals having sufficiently high reflectance at a wavelength of the reading light such as Au, Al, Ag, Cu, Ti, Cr, Ni, Pt, Ta and Pd, for example. Among them, Au, Al and Ag are suitable for the material of the reflective layer 26 because they have high reflectance. Other than these as the main compositions, the reflective layer 26 may contain the followings as other components. As examples of the other components, there are metals such as Mg, Se, Hf, V, Nb, Ru, W, Mn, Re, Fe, Co, Rh, Ir, Cu, Zn, Cd, Ga, In, Si, Ge, Te, Pb, Po, Sn, Bi and rare earth metals, and semimetals.

A film containing Ag as the main component is particularly preferable because the cost thereof is low, it provides high reflectance and a beautiful white ground color when a print accepting layer to be described later is further provided. Here, "main component" signifies a component whose rate of content is not less than 50 percent.

In order to secure high durability (high corrosion resistivity) of the reflective layer 26, it is preferable to use Ag in the form of alloy rather than as pure silver.

Among the alloys, an alloy that contains Ag as the main component and contains 0.1 to 15 atomic percent of at least one element selected from the group consisting of Ti, Zn, Cu, Pd, Au and rare earth metals is preferable. When the alloy contains two or more of Ti, Zn, Cu, Pd, Au and rare earth metals, each of them may be contained 0.1 to 15 atomic percent. However, it is preferable that the sum of these is 0.1 to 15 atomic percent.

A particularly preferable composition of the alloy is that Ag is contained as the main component, 0.1 to 15 atomic percent of at least one element selected from the group consisting of Ti, Zn, Cu, Pd and Au is contained, and 0.1 to 15 atomic percent of at least one rear earth element is contained. Among rare earth elements, neodymium is particularly preferable. More concretely, AgPdCu, AgCuAu, AgCuAuNd, AgCuNd or the like is preferable.

As the reflective layer 26, a layer made from only Au is preferable because of its high durability (high corrosion resistance), but is more expensive than a layer made from an Ag alloy.

It is possible to stack a thin film having low reflective index and a thin film having high reflective index, both of which are made from materials other than metals, one on the other to form a multilayer, and use it as the reflective layer 26.

As a method for forming the reflective layer 26, there are, for example, spattering, ion plating, chemical vapor deposition, vacuum evaporation, etc. It is possible to provide a known inorganic or organic intermediate layer or an adhesive layer on the upper surface and the lower surface of the reflective layer 26 in order to improve the reflectance, recording characteristics, adhesive properties and so forth.

(g) With Respect to Second Substrate 27

It is preferable that the second substrate 27 has shape stability so that the optical recording medium has some degree of rigidity. Namely, it is preferable that the second substrate 27 has high mechanical stability and large rigidity.

As such material, there can be used resins such as acrylic resins, methacrylic resins, polycarbonate resin, polyolefin resins (particularly amorphous polyolefin), polyester resins, polystyrene resin, epoxy resin and so forth, and glass.

The second substrate 27 may be comprised of a plurality of layers. For example, a resin layer made of a radiation-setting resin such as a photo-setting resin or the like may be formed on a substrate made of glass, a resin or the like to be used as the second substrate.

When the first substrate 21 does not have sufficient shape stability as above, the second substrate 27 is particularly required to have large shape stability. In this viewpoint, it is preferable that the second substrate 27 has low moisture absorption.

The second substrate 27 is not required to be transparent. When the second substrate 27 is transparent, the refractive index (refractive index to the wavelength of the recording beam or reading beam) of the second substrate 27 is generally not less than 1.40, preferably not less than 1.45, and generally not greater than 1.70, preferably not greater than 1.65.

As such material, the same material as that used for the first substrate 21 can be used. Other than this, there can be used an Al alloy substrate made from an Al—Mg alloy or the like containing Al as the main component, an Mg alloy substrate made from a Mg—Zn alloy or the like containing Mg as the main component, a substrate made from any one of silicon, titanium and ceramics, or a substrate made by combining them.

In the viewpoint of high productivity such as molding property and the like, cost, low moisture absorption, shape stability, etc., the above resins are preferable. Particularly, polycarbonate is preferable. In the viewpoint of chemical resistance, low moisture absorption, etc., amorphous polyolefin is preferable. In the viewpoint of high-speed responsibility, etc., a glass substrate is preferable.

In order to give sufficient rigidity to the optical recording medium, it is preferable that the second substrate 27 is thick to some degree, having a thickness of not less than 0.3 mm. However, since a thinner second substrate 27 is more advantageous to make the recording/reading apparatus thinner, the thickness of the second substrate 27 is preferably not greater than 3 mm, and more preferable not greater than 1.5 mm.

An example of a preferable combination of the first substrate 21 and the second substrate 27 is that the first substrate 21 and the second substrate 27 are made from the same material, and have the same thickness. By doing so, the rigidity of the first substrate 21 and the second substrate 27 are equivalent, which gives good balance. Whereby, the medium is prone not deform due to changes in environment, which is preferable. In which case, it is preferable that the degrees and directions of deformation of the both substrates caused by a change in environments are in harmony.

As another preferable example of the combination, the first substrate 21 is as thin as about 0.1 mm, whereas the second substrate 27 is as thick as about 1.1 mm. By doing so, the objective lens can easily approach the recording layer, whereby the recoding density is easily increased. Accordingly, this is preferable. In this case, the first substrate 21 may be in sheet-like shape, and may not have the guide groove.

A groove (guide groove) 32 used to guide a recording/reading light (recording/reading beam; for example, a laser beam) for recording or reading information is formed, spirally or concentrically, on the second substrate 27. When the groove is formed on the second substrate 27 as this, irregularities are formed on the surface of the second substrate 27. The concave portion (groove) of the irregularities is called a groove, whereas the convex portion is called a land. Incidentally, the groove 32 on the second substrate 27 is the convex portion with respect to the direction in which the light beam is irradiated.

Since the second recording layer 25 is formed in coating on the reflective layer 26 formed on the second substrate 27, the film thickness of the second recording layer 25 is large at the groove (concave portion) on the second substrate 27 (this portion called a thick film potion), whereas the film thickness of the same is small at the land (convex portion) on the second substrate 27 is small (this portion called a thin film portion).

In this embodiment, recording or reading of information can be performed on the second recording layer 25 with the groove and/or land being as the recording track because the depth of the groove 32 is small thereat, as will be described later.

In the case of the groove recording, the groove 32 on the second substrate 27 is make slightly snake in the radial direction at a predetermined amplitude and a predetermined frequency to form wobble. Isolated pits (address pits) may be formed in the land between the grooves 32 on the second substrate 27 (this called Land Pre-Pit; LPP), and address information may be beforehand recorded with the Land Pre-Pits. Other concave or convex pits (pre-pits) may be formed as required.

According to this embodiment, in the case of the land recording, the groove wall of the groove 32 on the second substrate 27 is made slightly snake in the radial direction at a predetermined amplitude and a predetermined frequency to form wobble in the land. Address information or other information may be beforehand recorded by forming pits in the groove.

From the viewpoint of cost, it is preferable to manufacture the second substrate 27 having such a concave portion and a convex portion in injection molding with a stamper having a concave portion and a convex portion. When a resin layer made from a radiation-setting resin such as a photo-setting resin or the like is formed on the substrate made from glass or the like, a concave portion and a convex portion such as a recording track and the like may be formed on the resin layer.

(i) With Respect to Buffer Layer 28

Here, the buffer layer 28 is provided as the intermediate layer between the transparent adhesive layer 24 and the second recording layer 25.

The buffer layer 28 is to prevent two layers from dissolving in each other and prevent the two layers from blending to each other. The buffer layer 28 may have another function than the function of preventing the dissolving phenomenon. Further, still another intermediate layer may be put as required.

The material of the buffer layer 28 is required to be immiscible with the second recording layer 25 or the transparent adhesive layer 24, and be optically transmittable to some degree. The known inorganic or organic material can be used for the buffer layer 28. In the viewpoint of the properties, an organic material is preferably used. For example, (a) metal or semiconductor, (b) oxide, nitride, sulfide, trisulfide, fluoride or carbide of metal or semiconductor, and (c) amorphous carbon or the like are available. Among these, a layer made from an almost transparent dielectric substance, or a very thin metal layer (including alloy) is preferable.

In concrete, oxides such as silicon oxide, particularly, silicon dioxide, zinc oxide, cerium oxide, yttrium oxide and the like; sulfides such as zinc sulfide, yttrium sulfide and the like; nitrides such as silicon nitride and the like; silicon carbide; a mixture (trisulfide) of an oxide and sulfur; and alloys to be described later are preferable. A mixture of silicon oxide and zinc sulfide at a ratio of approximately 30:70 to 90:10 by weight is preferable. A mixture ($Y_2O_2S$—ZnO) of sulfur, yttrium dioxide and zinc oxide is also preferable.

As the metal or alloy, silver or an alloy that contains silver as the main component and 0.1 to 15 atomic percent of at least one element selected from the group consisting of titanium, zinc, copper, palladium and gold is preferable. An alloy that contains silver as the main component and 0.1 to 15 atomic percent of at least one rare earth element is preferable, as well.

As the rare earth element, neodymium, praseodymium, cerium or the like is preferable.

Alternatively, any resin layer can be used so long as it does not solve the dye in the recording layer when the buffer layer is made. Particularly, a polymer film which can be fabricated in vacuum evaporation or CVD method is useful.

The thickness of the buffer layer 28 is preferably not less than 2 nm, and more preferably not less than 5 nm. When the buffer layer 28 is excessively thin, prevention of the above mixing phenomenon tends to be insufficient. The thickness of the buffer layer 28 is preferably not greater than 2000 nm, and more preferably not greater than 500 nm. Excessively thick buffer layer is not only necessary for prevention of the mixing but also may cause a decrease in the optical transmission. When the layer is made from an inorganic substance, the film deposition of the layer takes a longer time, which causes a decrease in productivity, or the film stress is increased. Thus, the film thickness is preferably not greater than 200 nm. Particularly, since a film made from a metal excessively deteriorates the optical transmittance, the film thickness is preferably not greater than approximately 20 nm.

Another buffer layer may be provided as an intermediate layer between the semitransparent reflective layer 23 and the transparent adhesive layer 24, for example.

(j) With Respect to Other Layers

In this laminated structure, another layer may be arbitrarily put in the layers as required. Alternatively, it is possible to arbitrarily provide another layer on the outermost surface of the medium.

In concrete, it is possible to provide a protective layer to protect the recording layer or the reflective layer. The material of the protective layer is not specifically limited but any material is available so long as it protects the recording layer or the reflective layer from the external force. As an organic material of the protective layer, available are a thermal plastic resin, a thermal setting resin, an electron beam setting resin, an ultraviolet ray-curable resin and the like. As an organic material of the protective layer, available are silicon oxide, silicon nitride, $MgF_2$, $SnO_2$ and the like.

The protective layer can be formed by dissolving a thermal plastic resin, a thermal setting resin or the like in an appropriate solvent to prepare a coating liquid, and applying and drying the liquid. In the case of a ultraviolet ray-curable resin, the protective layer can be formed by preparing a coating liquid of the ultraviolet ray-curable resin itself or a coating liquid obtained by dissolving the ultraviolet ray-curable resin in an appropriate solvent, applying the coating liquid, irradiating UV light to cure the liquid. As the ultraviolet ray-curable resins, available are acrylic resins such as urethane acrylate, expoxy acrylate, polyester acrylate, etc. These materials can be used solely or can be mixed to be used. Further, use of not only a single layer but also a multilayer is possible.

As the method of forming the protective layer, there are coating methods such as spin coating, cast and the like, sputtering, chemical evaporation, etc. Among these, spin coating is preferable.

The film thickness of the protective layer is generally within a range from 0.1 to 100 μm. In the optical recording medium of this invention, the film thickness of the protective layer is preferably from 1 to 50 μm.

Further, a print accepting layer, on which writing (printing) is possible with various printers such as ink-jet printer, thermal printer and the like, or various writing tools, may be put on a surface that is not a surface through which the recording/reading beam comes in, as required.

It is possible to add another recording layer in this structure to realize a structure having three or more recording layers. It is also possible to bond two optical recording media of this structure, with the first substrates 21 of the media being outside, to provide a larger capacity medium having four recording layers.

The single-sided incident type optical recording medium having the two dye containing recording layers 22 and 25 as above has the first dye containing recording layer 22 close to the side from which the light beam comes in (on one side), and the second dye containing recording layer 25 far from the same. For this, recording or reading of information in and from the second dye containing recording layer 25 positioned father from the side from which the light beam comes in are performed by irradiating the light beam through the first dye containing recording layer 22.

In such the single-sided incident type optical recording medium, when the depth of the groove (guide groove, concave portion) 32 formed on the second substrate 27 positioning on the opposite side to the side from which the light beam comes in is, for example, approximately 150 nm like general optical recording media, there is possibility that the reflectance necessary to perform recording or reading of information on the second dye containing recording layer 25 cannot be obtained.

In the optical recording medium according to this embodiment, the depth of the groove 32 on the second substrate 27 is decreased to be shallow in a specific region, dissimilar to the depth of the groove of general dye containing optical recording media so that a change in shape of the reflective layer reflecting the shape of the groove is made small. Whereby, it is possible to obtain sufficient reflectance to perform recording or reading of information on the second dye containing recording layer 25. Such sufficiently large reflectance is advantageous to provide easy compatibility with DVD-ROM. When a shallow groove on the second substrate 27 is allowable, the productivity of the second substrate 27 having the guide groove is improved, which improves the mass productivity.

Unlike the known general dye optical recording media, the depth of the groove 32 in a specific region on the second substrate 27 is made shallow so that the reflectance sufficient to perform recording or reading of information on the second dye containing recording layer 25 can be obtained. Whereby, it is possible to use the thin film portion 25B or the thick film portion 25A of the second dye containing recording layer 25 as the recording track. Namely, the light beam can be emitted (irradiated) onto the land (convex portion) on the second substrate 27, that is, the concave portion (thin film portion 25B) of the second recording layer 27, to record or read information. Alternatively, the light beam can be emitted (irradiated) onto the groove (concave portion) on the second substrate 27, that is, the convex portion (thick film portion 25A) of the second recording layer 25, to record or read information.

In the optical recording medium of this embodiment, the depth of the groove 32 on the second substrate 27 is practically set as below.

It is preferable that the depth (groove depth) of the groove 32 on the second substrate 27 is not less than $1/100 \times \lambda$ where $\lambda$ represents the recording/reading wavelength. More preferably, the depth is not less than $2/100 \times \lambda$, still more preferably $3/100 \times \lambda$ because the depth in this degree is preferable to secure sufficient reflectance and perform stable tracking.

When the recording/reading wavelength is $\lambda=650$ nm, for example, the depth of the groove 32 on the second substrate 27 is preferably not less than 7 nm, more preferably not less than 13 nm, still more preferably not less than 20 nm.

The depth of the groove 32 on the second substrate 27 is preferably not greater than $1/6 \times \lambda$, more preferably not greater than $1/8 \times \lambda$, still more preferably not grater than $1/10 \times \lambda$ because not excessively large depth is preferable to decrease a change in shape of the reflective layer in order to secure the quantity of reflected light, and obtain high reflectance.

When the recording/reading wavelength is $\lambda=650$ nm, the depth of the groove 32 on the second substrate 27 is preferably not greater than 108 nm, more preferably not greater than 81 nm, still more preferably not greater than 65 nm.

The width (groove width, G width; half width) of the groove 32 on the second substrate 27 is preferably not less than $1/10 \times T$ where T represents the track pitch, more preferably not less than $2/10 \times T$, still more preferably not less than $3/10 \times T$ because excessively narrow groove width tends to make it difficult to easily track.

When the track pitch is 740 nm, for example, the width of the groove 32 on the second substrate 27 is preferably not less than 74 nm, more preferably not less than 148 nm, still more preferably not less than 222 nm.

The width of the groove 32 on the second substrate 27 is preferably not greater than $9/10 \times T$, more preferably not greater than $8/10 \times T$, still more preferably not greater than $7/10 \times T$ because excessively wide groove tends to make them difficult to easily track and to record well.

When the track pitch is 740 nm, for example, the width of the groove 32 on the second substrate 27 is preferably not greater than 666 nm, more preferably not greater than 592 nm, and still more preferably not greater than 518 nm.

According to this embodiment, the depth of the groove 32 on the second substrate 27 is smaller than the depth of the groove of the general dye optical recording medium, as above. It is preferable that the depth of the groove 32 on the second substrate 27 is smaller than the depth of the groove 31 on the first substrate 21.

When the recording/reading wavelength is 650 nm, for example, it is preferable to set the depth of the groove 32 on the second substrate 27 to not greater than 65 nm and set the depth of the grove 31 on the first substrate 21 to not less than 108 nm. Note that a combination of the depths of the grooves on the first substrate 21 and the second substrate 27 to be set is not limited to the above example. It is only necessary that the depth of the groove 32 on the second substrate 27 is smaller than the depth of the groove 31 on the first substrate 21.

It is generally preferable that the depth of the groove 32 on the second substrate 27 is smaller than the groove 31 on the first substrate 21. Specifically, the depth of the groove 32 on the second substrate 27 is preferably not greater than 90% of the depth of the groove 31 on the first substrate 21, more preferably not greater than 80%, and still more preferably not greater than 70%. The depth of the groove 32 on the second substrate 27 is generally not less than 5% of the depth of the groove 31 on the first substrate 21, and preferably not less than 10%.

In the single-sided incident type optical recording medium as above, excellent recording/reading characteristics can be obtained when the recording track is formed in the concave portion (thick film portion 22A) of the first dye containing recording layer 22. To the contrary, when the recording track is formed in the concave portion (thick film portion 25A) of the second dye containing recording layer 25, there is possibility that more excellent recording/reading characteristics (for example, reflectance, polarity, maximum signal amplitude, etc.) cannot be obtained.

In the optical recording medium according to this embodiment having the first dye containing recording layer 22 having the thick film portion 22A and the thin film portion 22B, and the second dye containing recording layer 25 having the thick film portion 25A and the thin film portion 25B, the recording track is formed in the thick film portion 22A of the first dye containing recording layer 22 closer to the side from which the light beam comes in (on one side), whereas the recording track is formed in the thin film portion 25B of the second dye containing recording layer 25 farther from the side from which the light beam comes in, whereby more excellent recording/reading characteristics can be obtained.

The reason why more excellent recording/reading characteristics can be obtained when recording is performed on the thin film portion 25B of the second dye containing recording layer 25 is presumed that the following fact influences.

The phase difference (difference in optical path length) between the concave portion (non-track portion) and the convex portion (track portion) at the time that the light beam is irradiated is important in order to perform tracking on the recording track to record or read well.

In the first recording layer 22, a difference between the reflected light beam from an interface between the first recording layer 22 and the semitransparent reflective layer 23 at the concave portion and the reflected light beam from an interface between the same at the convex portion is equivalent to a difference in optical path length. The difference in optical path length is determined from, mainly, a distance d1 between surfaces of the concave portion and the convex portion of the first recording layer 22 on the side from which the light beam comes in (a distance between a surface of the thin film portion 22B of the first recording layer 22 and a surface of the thick film portion 22A of the same on the first substrate's side) (refer to FIG. 1), a difference in film thickness between the concave portion and convex portion of the first recording layer 22, a complex index of refraction of the first recording layer 22, and a complex index of refraction of the first substrate 21.

On the other hand, in the second recording layer 25, a difference between the reflected light beam from an interface at the concave portion between the second recording layer 25 and the reflective layer 26 and the reflected light beam from an interface at the convex portion between the same is equivalent to a difference in optical path length. The difference in optical path length is mainly determined from a distance d2 between surfaces of the concave portion and convex portion of the second recording layer 25 on the side from which the light beam comes in [a distance between a surface of the thin film portion 25B of the second recording layer 25 and a surface of the thick film portion 25A of the same on the transparent adhesive layer's side (intermediate layer's side)] (refer to FIG. 1), a difference in film thickness between the concave portion and convex portion of the second recording layer 25, a complex index of refraction of the second recording layer 25, and a complex index of refraction of the transparent adhesive layer 24.

In this case, d2 inevitably differs from d1. Namely, since the groove is filled to some degree by coating the recording layer thereon and the irregularity is formed on the surface in such state, d2 is considerably smaller than d1.

For this, the difference in optical path length and the difference in phase in turn behave differently from those of the first recording layer 22. For this reason, it is presumed that the recording in the thin film portion 25B is more preferable in the second recording layer 25.

In order to form the recording track in the thin film portion 25B of the second recording layer 25, it is necessary to secure the thickness necessary to allow the thin film portion 25B of the second recording layer 25 to function as the recording layer. Namely, it is preferable that the thin film portion 25B of the second recording layer 25 has a thickness (L film thickness) not less than predetermined thickness (for example, 70 nm). When the second recording layer 25 is formed by coating a solvent containing a dye in spin coating, for example, the film thickness of the second recording layer 25 can be not less than predetermined thickness by varying the concentration of the dye or varying the number of spin rotation as the recording layer coating condition.

The difference in film thickness between the thick film portion 25A and the thin film portion 25B of the second recording layer 25 is preferably not less than $1/100 \times \lambda/n$ where $\lambda$ represents the recording/reading wavelength and n represents the refractive index of the second recording layer 25, more preferably not less than $2/100 \times \lambda/n$, and still more preferably not less than $3/100 \times \lambda/n$.

The difference in film thickness is preferably not greater than $1/3 \times \lambda/n$, more preferably not greater than $1/4 \times \lambda/n$, and still more preferably not greater than $1/5 \times \lambda/n$.

Practically, when the recording/reading wavelength is $\lambda=650$ nm and the refractive index of the second recording layer 25 is n=2.2, the difference in film thickness between the thick film portion 25A and the thin film portion 25B of the second recording layer 25 is preferably not less than 3 nm, more preferably not less than 6 nm, and still more preferably not less than 9 nm. The difference in film thickness is preferably not greater than 98 nm, more preferably not greater than 74 nm, and still more preferably not greater than 59 nm.

On the other hand, the difference in film thickness between the thick film portion 22A and the thin film portion 22B of the first recording layer 22 is preferably not less than $1/30 \times (\lambda/n)$ where $\lambda$ represents the recording/reading wavelength and n represents the refractive index of the first recording layer, more preferably not less than $2/30 \times \lambda/n$, and still more preferably not less than $3/30 \times \lambda/n$.

The difference in film thickness is preferably not greater than $4/4 \times (\lambda/n)$, more preferably not greater than $4/5 \times (\lambda/n)$, and still more preferably not greater than $4/6 \times (\lambda/n)$.

Practically, when the recording/reading wavelength is $\lambda=650$ nm and the refractive index of the first recording layer 22 is n=2.2, the difference in film thickness between the thick film portion 22A and the thin film portion 22B of the first recording layer 22 is preferably not less than 10 nm, more preferably not less than 20 nm, and still more preferably not less than 30 nm. The difference in film thickness is preferably not greater than 295 nm, more preferably not greater than 236 nm, and still more preferably not greater than 197 nm.

In this embodiment, since the thick film portion 22A and the thin film portion 22B of the first recording layer 22 are formed correspondingly to the concave portion and the convex portion on the first substrate 21 positioned on the side from which the light beam comes in, it is preferable that the recording track is formed in the groove (concave portion) on the first substrate 21, that is, in the convex portion (thick film portion 22A) of the first recording layer 22 protruding to the side from which the light beam comes in.

In this case, recording or reading of information is performed by emitting (irradiating) the light beam to the groove (concave portion) on the first substrate 21, that is, the convex portion (thick film portion 22A) of the first recording layer 22, in this optical recording medium.

In this embodiment, since the thick film portion 25A and the thin film portion 25B of the second recording layer 25 are formed correspondingly to the concave portion and the convex portion on the second substrate 27 positioned on the opposite side to the side from which the light beam comes in, it is preferable that the recording track is formed in the land (convex portion) on the second substrate 27, that is, the convex portion (thin film portion 25B) of the second recording layer 25 protruding to the side from which the light beam comes in.

In this case, recording or reading of information is performed by emitting (irradiating) the light beam to the land (convex portion) on the second substrate 27, that is, the convex portion (thin film portion 25B) of the second recording layer 25 in the optical recording medium.

In the optical recording medium according to this invention, the recording track may be formed in the groove on the first substrate 21, whereas the recording track may be formed in the land on the second substrate 27. In such case, it may be necessary to change the tracking polarity when information is recorded in or read from the recording layers.

According to this embodiment, the depth of the groove 32 on the second substrate 27 is set smaller than the depth of the groove of the known dye optical recording medium, or the recording track is formed in the thin film portion 25B of the second dye containing recording layer 25 farther from the side from which the light beam comes in, whereby the information recording/reading characteristics of the second dye containing recording layer 25 are improved. It is more preferable to combine the above manners so that the depth of the groove 32 on the second substrate 27 is set shallower and the recording track is formed in the thin film portion 25B of the second dye containing recording layer 25.

Whereby, it is possible to stably obtain sufficient reflectance for recording or reading information in or from the dye containing recording layer 25, and more excellent recording characteristics.

(2) Optical Recording Medium Manufacturing Method

Next, description will be made of a method of manufacturing the optical recording medium structured as above.

First, a laminated structure (first information recording body) having the first recording layer 22 containing a dye and the semitransparent reflective layer 23 in this order on the transparent first substrate 21 is fabricated. On the other hand, a laminated structure (second information recording body) having the reflective layer 26, the second recording layer 25 containing a dye and the buffer layer 28 in this order on the second substrate 27 is fabricated. The first information recording body and the second information recording body are bonded together through the transparent adhesive layer 24, with the recording layers facing to each other.

Practically, the transparent first substrate 21, on the surface of which grooves, lands and pre-pits are formed as a concave portion and a convex portion, is fabricated in injection molding, 2P method or the like (method of transferring a concave portion and a convex portion with a resin stamper having a concave portion and a convex portion to a setting resin such as a photo-setting resin or the like, and hardening the resin to make the substrate).

Next, at least an organic dye is dissolved in a solvent, deposited on a surface having the concave portion and the convex portion of the first substrate 21 in spin coating or the like to form the first recording layer 22.

On the first recording layer 22, an Ag alloy or the like is spattered or evaporated to deposit the semitransparent reflective layer 23, thereby to fabricate the first information recording body.

Next, the second substrate 27, on a surface of which grooves, lands and pits are formed as a concave portion and a convex portion, is fabricate in injection molding, 2P method or the like. An Ag alloy or the like is spattered or evaporated on a surface having the concave portion and the convex portion of the second substrate 27 to deposit the reflective film layer 26.

Further, at least an organic dye is dissolved in a solvent, deposited in spin coating or the like to form the second recording layer 25.

Next, a dielectric material or the like is spattered to deposit the buffer layer 28, thereby to fabricate the second information recording body.

An adhesive of a ultraviolet ray-curable resin or the like is coated on the first information recording body, the second information recording body is mounted thereon, and the adhesive is spread over the entire surface thereof by, for example, rotating it at high speed or applying pressure. This is performed while adjusting the speed or pressure so that the film thickness of the adhesive layer is in a predetermined range.

After that, ultraviolet ray is irradiated from the first information recording body's side through the semitransparent reflective layer 23 to harden the adhesive of an ultraviolet ray-curable resin or the like to adhere the recording bodies together, whereby the optical recording medium is fabricated.

Alternatively, the ultraviolet ray may be irradiated from the side of the media. In either case, care should be taken not to damage the dye recording layer by the ultraviolet ray. It is possible to use a pressure-sensitive double-sided adhesive tape, put the tape between the first information recording body and the second information recording body, and press them to form an adhesive layer. Alternatively, the adhesive layer can be formed by using an adhesive of the delayed-curable type, coating the adhesive on the first information recording body in screen printing or the like, irradiating ultraviolet ray thereon, mounting the second information recording body on the first information recording body, and pressing them. Generally, many of the adhesives of the delayed-curable type are opaque.

Next, description will be made of a method of fabricating the substrates 21 and 27 having guide grooves (a concave portion and a convex portion).

For example, to form a concave portion and a convex portion (grooves) on the substrates 21 and 27, a metal stamper having desired a concave portion and a convex portion is used, and the concave portion and the convex portion are transferred onto a resin material in injection molding to make the first substrate 21. Another stamper having reverse a concave portion and a convex portion is used, the concave portion and the convex portion are transferred onto a resin material in injection molding to make the second substrate 27.

For example, wobble is particularly formed on the recording track to give synchronization information, address information and the like thereto.

In this embodiment, since the recording track is formed in the thick film portion 22A of the first recording layer 22, whereas the recording track is formed in the thin film portion 25B of the second recording layer 25, the wobble is formed on the concave portion on the first substrate 21 and the convex portion on the second substrate 27.

The wobble is formed on the concave portion on the first substrate 21 in the following procedure.

First, a glass substrate/photo-resist is exposed and developed while the beam is made meander to obtain a negative having a concave portion and a convex portion. On the negative having a concave portion and a convex portion, the wobble is generally formed on the concave portion (groove).

A stamper is made, using the negative having a concave portion and a convex portion. With the made stamper, the first substrate 21 having a concave portion and a convex portion (grooves, guide grooves) is made in injection molding. In this case, since the wobble is formed on the convex portion of the stamper, the wobble is made on the concave portion on the first substrate 21.

To form the wobble on the convex portion on the second substrate 27, it is necessary that the wobble is present on the concave portion of the stamper. For this, the above method cannot give the wobble to the convex portion on the second substrate 27.

So, a stamper is made in the same manner as the stamper used to form the concave portion and the convex portion (grooves, guide grooves) on the first substrate 21 is made. Here, it is necessary to change the shape of the concave portion and the convex portion (groove depth, groove width, width of meandering, etc.) to match it to a concave portion and a convex portion to be formed on the second substrate 27.

Next, the concave portion and the convex portion are transferred from the stamper to make a negative stamper having reverse a concave portion and a convex portion. In this case, since the wobble is formed on the convex portion on the stamper, the wobble is formed on the concave portion on the negative stamper.

With the negative stamper, the second substrate 27 having the concave portion and the convex portion (grooves, guide grooves) is fabricated in injection molding. In this case, since the wobble is formed on the concave portion on the negative stamper, the wobble is formed on the convex portion on the second substrate 27.

(3) Optical Recording Medium Recording/Reading Method

Next, description will be made of a recording/reading method for the optical recording medium according to this embodiment.

Recording in the optical recording medium structured as above is performed by irradiating a laser beam focused to a diameter of approximately 0.5 to 1 μm onto the recording layer from the first substrate's side. In a portion on which the laser beam is irradiated, thermal deformation of the recording layer such as decomposition, heat build-up, dissolution or the like occurs due to absorption of the energy of the laser beam, the optical characteristics of the recording layer are thereby changed.

Reading of recorded information is performed by reading, with the laser beam, a difference in reflectance between a portion in which the optical characteristics have changed and a portion in which the optical characteristics remain unchanged.

Recording and reading are performed on each of the two recording layers in the following manner. Whether the converging position of the converged laser beam is on the first recording layer 22 or the second recording layer 25 can be discriminated by using a focus error signal obtained in the knife edge method, astigmatism method, Foucault method or the like. Namely, when the objective lens for focusing the laser beam is shifted in the vertical direction, a different S-shaped curve is obtained according to whether the focus position of the laser beam is on the first recording layer 22 or on the second recording layer 25. It is possible to select the first recording layer 22 or the second recording layer 25 to be recorded or read by selecting either one of the S-shaped curves.

In this embodiment, when information is recorded or read in or from the first recording layer 22, it is preferable that the light beam is emitted (irradiated) on the groove (concave portion) on the first substrate 21, that is, the convex portion (thick film portion 22A) of the first recording layer 22, to record or read information. When information is recorded or read in or from the second recording layer 25, it is preferable that the laser beam is emitted (irradiated) on the land (convex portion) on the second substrate 27, that is, the convex portion (thin film portion 25B) of the second recording layer 25, to record or read information.

As the laser beam used for the optical recording medium according to this embodiment, $N_2$, He—Cd, Ar, He—Ne, ruby, semiconductor, dye laser, etc. are available. Among these, the semiconductor laser is preferable because of its light weight, compactness, facility, etc.

It is preferable that the wavelength of the used laser beam is as short as possible for the purpose of high-density recording. Particularly, the laser beam having a wavelength of 350 to 530 nm is preferable. As a typical example of such laser beam, there are laser beams having center wavelengths of 405 nm, 410 nm and 515 nm. For example, the laser beam having a wavelength within a range from 350 to 530 nm can be obtained by using a 405 nm or 410 blue high-power semiconductor laser or a 515 nm bluish green high-power semiconductor laser. Other than these, the laser beam can be obtained by wavelength-modulating, by means of a second harmonic generating element (SHG), either (a) a semiconductor laser that can continuously oscillate fundamental oscillation wavelengths of 740 to 960 nm, or (b) a solid state laser that is excited by a semiconductor laser and can continuously oscillate fundamental oscillation wavelengths of 740 to 960 nm.

As the above SHG, any piezo element lacking inversion symmetry is usable, but KDP, ADP, BNN, KN, LBO and compound semiconductors are preferable. As practical examples of the second harmonic wave, there are 430 nm which is a double of 860 nm in the case of a semiconductor laser having a fundamental oscillation wavelength of 860 nm, 430 nm which is a double of 860 nm from Cr-doped $LiSrAlF_6$ crystal (having a fundamental oscillation wavelength of 860 nm) in the case of a solid laser excited by a semiconductor laser, etc.

(4) Working/Effects

According to the optical recording medium, and the manufacturing method for the optical recording medium and the recording/reading method for the optical recording medium of this embodiment, in an optical recording medium having a plurality of recording layers 22 and 25 in which information is recorded or read by irradiating a laser beam from one side thereof, the laser beam is irradiated on the thin film portion 25B of the second recording layer 25 positioned farther from the side from which the laser beam comes in to perform recording or reading of information. It is thus possible to obtain sufficient reflectance and excellent recording/reading characteristics (for example, reflectance, polarity, maximum signal amplitude, etc.) when recording or reading of information is performed on the second recording layer 25 positioned farther from the side from which the laser beam comes in. As a result, excellent recording/reading characteristics can be obtained in both the plural recording layers 22 and 25.

(5) Others

In this embodiment, this invention is applied to a single-sided incident type DVD-R of the bonded dual layer type. However, this invention is not limited to this. This invention can be applied to an optical recording medium in any structure so long as it has dye containing recording layers in which recording or reading of information is performed by irradiating a laser beam from one side thereof.

Figure 2:
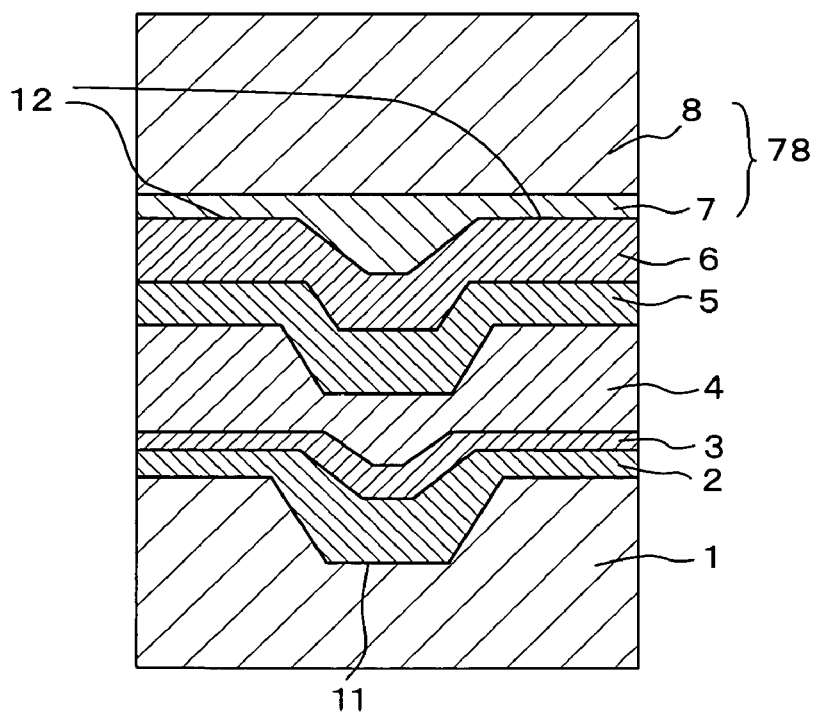
FIG. 2 is a schematic diagram showing the whole structure of another optical recording medium according to the embodiment of this invention.

As shown in FIG. 2, this invention can be applied to a single-sided incident type DVD-R of the laminated dual layer type having a first recording layer containing a dye (first dye containing recording layer) 2, a semitransparent reflective layer (semitransparent reflective layer) 3, an intermediate resin layer (intermediate layer) 4, a second recording layer containing a dye (second dye containing recording layer) 5, a reflective layer 6, a second substrate 78 (comprised of an adhesive layer 7 and a substrate body 8) in this order on a disk-shaped transparent (light-transmissible) first substrate (first light-transmissible substrate) 1. Incidentally, reference characters 11 and 12 designate guide grooves (grooves, concave portions).

In this case, recording or reading information in or from the second recording layer 5 positioning farther from the side from which the laser beam comes in is performed with a guide groove (groove, concave portion) 12 formed on the second substrate 78 (substrate positioning on the opposite side to the side from which the laser beam comes in). In order to obtain sufficient reflectance, the depth of the guide groove 12 is within a range from $1/100 \times \lambda$ to $1/6 \times \lambda$ where $\lambda$ represents the recording/reading wavelength.

In order to obtain excellent recording/reading characteristics, it is preferable to form the recording track in the groove (groove, concave portion) 12 on the second substrate 78, that is, the concave portion (thin film portion) of the second recording layer 5. Namely, it is preferable to emit (irradiate) the laser beam on the groove (groove, concave portion) 12 on the second substrate 78, that is, the concave portion (thin film portion) of the second recording layer 5 to record or read information.

When this invention is applied to a single-sided incident type optical recording medium of the bonded dual layer type, this invention is particularly effective and preferable. Namely, it is effective that this invention is applied to an optical recording medium which has a first information recording body having at least a first dye containing recording layer containing a first dye and a semitransparent reflective layer laminated in this order on a first substrate having a guide groove and a second information recording body having at least a reflective layer and a second dye containing recording layer containing a second dye laminated in this order on a second substrate having a guide groove, the optical recording medium being formed by bonding the first information recording body and the second information recording body together through an optically transparent adhesive layer, with surfaces on the opposite side to the substrates of the first information recording body and the second information recording body facing to each other, in which information is recorded or read by irradiating a laser beam from the first substrate's side.

Since two information recording bodies are bonded together, with the opposite sides facing to each other, in such optical recording medium, a state in which the grooves are filled with the dye containing recording layer, or a difference in optical path length between the groove and the land tends to differ between the two information recording bodies. For this, it is considered that the optimum depth of the groove on the second substrate differs from that on the first substrate, and a smaller depth of the groove on the second substrate than the depth of the groove on the first substrate can yield the optimum value.

This invention can be applied to not only an optical recording medium of a so-called substrate incident type but also an optical recording medium of a so-called film incident type. Namely, this invention can be applied to an optical recording medium (optical recording medium having one dye containing recording layer) having a substrate body (including a protective layer, substrate, etc.), a dye containing recording layer, reflective layer and a substrate having a guide groove, in which information is recorded or read by irradiating a light beam from the substrate body's side (opposite side to the substrate).

In such case, in order to obtain sufficient reflection from the guide groove (groove, concave portion) formed on the substrate (substrate positioning on the opposite side to the side from which the light beam comes in), the depth of the groove on the substrate is within a range from $1/100 \times \lambda$ to $1/6 \times$ where $\lambda$ represents the recording/reading wavelength.

Whereby, sufficient reflectance can be obtained when information is recorded in or read from the dye containing recording layer by irradiating the light beam from the opposite side to the substrate. As a result, excellent recording/reading characteristics are obtained.

Note that this invention is not limited to the above embodiment, but may be modified in various ways without departing from the scope of the invention.

EXAMPLES

Next, this invention will be further described in detail by way of examples. Note that this invention is not limited to the following examples.

(Preparation of Optical Recording Medium)

An optical recording medium in examples and comparative examples has a first information recording body having at least a first dye containing recording layer containing a first dye and a semitransparent reflective layer laminated in this order on a first substrate having a guide groove, and a second information body having at least a reflective layer and a second dye containing recording layer containing a second dye laminated in this order on a second substrate 2 having a guide groove, and is formed by bonding the first information recording body and the second information recording body through an optically transparent adhesive layer, with the opposite sides to the substrates of the first information recording body and the second information recording body facing to each other.

Hereinafter, preparation of the second information recording body will be mainly described.

First, a second substrate (having a refractive index of 1.56) made of polycarbonate having a thickness of 0.6 mm, which had a track pitch of 740 nm and a guide groove having predetermined depth and predetermined width was prepared in injection molding, with a mother stamper (negative stamper).

Next, a silver alloy containing not less than 97 atomic percent of Ag was spattered on the second substrate to form a reflective layer.

On the reflective layer, a octafluoropentanol solution of a metal complex azo dye was spin-coated under a predetermined coating condition (dye concentration), dried at a temperature of 100° C. for 30 minutes to form a second dye containing recording layer. Here, the coating condition was changed to give predetermined film thickness to the second dye containing recording layer. This recording layer had a refractive index of 2.25 and an extinction coefficient of 0.02.

On the second dye containing recording layer, any one of a silver alloy containing not less than 97 atomic percent of Ag, $(ZnS)_{80}(SiO_2)_{20}$ or $SiO_2$ was spattered to form a buffer layer, an ultraviolet ray-curable resin (SPC-920 manufactured by Nippon Kayaku Co., Ltd.) was spin-coated thereon to a thickness of approximately 5 to 7 μm to form a protective layer.

Generally, a radical type ultraviolet ray-curable resin (adhesive) is coated in spin coating on the above protective layer, bonded to a first substrate containing a recording layer (first recording layer) separately prepared, with this layer and the reflective layer of the first substrate facing to each other, to prepare an optical recording medium.

Here, in order to eliminate an effect of the first information recording body and precisely evaluate the characteristics of the second recording layer, a groove-less polycarbonate substrate (having a refractive index of 1.56) having a thickness of 0.6 mm without the recording layer and the semitransparent reflective layer was used as the first information recording body. The refractive index of the adhesive layer after hardened was 1.53.

(Measuring Method)

First, the reflectance of the un-recorded second recording layer was measured by an evaluation machine equipped with a semiconductor laser having a wavelength of 657 nm (NA=0.65) (DDU-1000 having the maximum recording power of 15 mW manufactured by Pulstec Industrial Co., Ltd). Next, EFM+ signals modulated in 8/16 modulation were recorded at a recording linear velocity of 3.8 m/s (1-times velocity) with a recording power at which the asymmetry of the recorded signals was approximately zero, and the reflectance, the polarity and the maximum signal amplitude (amplitude of the longest mark; so-called Modulation; I14/I14H) of the recorded signals were measured.

In these examples, it was considered that a reflectance of not less than 25% is excellent, and a reflectance of 30% is more excellent. For keeping the compatibility with DVD-ROM, a reflectance of several tens % at the unrecorded portion of the second recording layer is sufficient, in general. Since the media in these examples do not have the first recording layer and the semitransparent reflective layer, there is tendency that the reflectance is higher than that of practical examples. When a reflectance of not less than 25% is obtained in these examples, it is considered that a reflectance of several tens % can be obtained even if practical effects of the first information recording body are considered.

For the compatibility with DVD-ROM or the like, it is desirable that the polarity of the recorded signals is H to L.

It is generally preferable that the maximum signal amplitude is large. The maximum signal amplitude is generally preferably not less than 0.5, and more preferably not less than 0.6. However, the maximum signal amplitude can be improved by adjusting the film thickness of the recording layer, the groove shape, the recording power, the recording pulse waveform (recording strategy), etc. For this, even when the value of the maximum signal amplitude is small, the medium is usable as an optical recording medium only if the reflectance is sufficient. For example, the maximum signal amplitude can be increased by recording the signals at high recording power to increase the width of the recording mark in the direction of the track.

Results of measurement of reflectance, polarity, maximum signal amplitude in the examples and comparative examples are as shown in Table 1 below.

To satisfy a relationship of the groove depth of $1/100 \times \lambda$ to $1/6\lambda$ at the time that the recording/reading wavelength is $\lambda=657$ nm, the groove depth is required to fall within a range from 6.57 nm to 109.5 nm.

TABLE 1

| | recording portion | groove depth (nm) | L width (nm) | G width (nm) | L film thickness (nm) | G film thickness (nm) | buffer layer | reflectance | polarity | Max. signal amplitude | recording Layer coating conditions (dye concentration; wt %) |
|---|---|---|---|---|---|---|---|---|---|---|---|
| Ex. 1 | G | 65 | 420 | 320 | 70 | 110 | Ag alloy | 30.7 | HtoL | <0.1 | 3.55 wt % |
| Ex. 2 | L | 65 | 420 | 320 | 70 | 110 | Ag alloy | 40.0 | HtoL | 0.79 | 3.55 wt % |
| Ex. 3 | L | 65 | 420 | 320 | 70 | 110 | SiO2 | 28.1 | — | — | 3.55 wt % |
| Ex. 4 | L | 65 | 420 | 320 | 80 | 135 | Ag alloy | 27.4 | — | — | 4.43 wt % |
| Ex. 5 | L | 65 | 420 | 320 | 80 | 135 | ZnS—SiO2 | 26.7 | — | — | 4.43 wt % |
| Ex. 6 | L | 65 | 420 | 320 | 80 | 135 | SiO2 | 29.7 | — | — | 4.43 wt % |
| Ex. 7 | G | 50 | 330 | 410 | 75 | 105 | Ag alloy | 40.1 | — | — | 3.55 wt % |
| Ex. 8 | G | 50 | 330 | 410 | 75 | 105 | SiO2 | 30.9 | HtoL | 0.36 | 3.55 wt % |
| Ex. 9 | G | 50 | 330 | 410 | 95 | 130 | Ag alloy | 29.1 | HtoL | LS | 4.43 wt % |
| Ex. 10 | G | 50 | 330 | 410 | 95 | 130 | ZnS—SiO2 | 31.3 | HtoL | 0.31 | 4.43 wt % |
| Ex. 11 | G | 50 | 330 | 410 | 95 | 130 | SiO2 | 31.2 | HtoL | 0.3 | 4.43 wt % |
| Ex. 12 | L | 50 | 330 | 410 | 75 | 105 | Ag alloy | 45.3 | — | — | 3.55 wt % |
| Ex. 13 | L | 50 | 330 | 410 | 75 | 105 | ZnS—SiO2 | 29.0 | — | — | 3.55 wt % |
| Ex. 14 | L | 50 | 330 | 410 | 75 | 105 | SiO2 | 36.4 | HtoL | 0.74 | 3.55 wt % |
| Ex. 15 | L | 50 | 330 | 410 | 95 | 130 | Ag alloy | 31.1 | HtoL | 0.71 | 4.43 wt % |
| Ex. 16 | L | 50 | 330 | 410 | 95 | 130 | ZnS—SiO2 | 38.2 | HtoL | 0.66 | 4.43 wt % |
| Ex. 17 | L | 50 | 330 | 410 | 95 | 130 | SiO2 | 36.1 | HtoL | 0.73 | 4.43 wt % |
| Ex. 18 | G | 30 | 520 | 220 | 70 | 85 | Ag alloy | 43.0 | — | — | 3.10 wt % |
| Ex. 19 | G | 30 | 520 | 220 | 70 | 85 | ZnS—SiO2 | 39.0 | HtoL | 0.22 | 3.10 wt % |
| Ex. 20 | G | 30 | 520 | 220 | 70 | 85 | SiO2 | 43.2 | HtoL | 0.11 | 3.10 wt % |
| Ex. 21 | G | 30 | 520 | 220 | 90 | 100 | Ag alloy | 30.2 | HtoL | <0.1 | 3.55 wt % |
| Ex. 22 | G | 30 | 520 | 220 | 90 | 100 | ZnS—SiO2 | 41.7 | — | — | 3.55 wt % |
| Ex. 23 | G | 30 | 520 | 220 | 90 | 100 | SiO2 | 38.9 | HtoL | 0.17 | 3.55 wt % |
| Ex. 24 | L | 30 | 520 | 220 | 70 | 85 | Ag alloy | 49.1 | — | — | 3.10 wt % |
| Ex. 25 | L | 30 | 520 | 220 | 70 | 85 | ZnS—SiO2 | 43.9 | HtoL | 0.72 | 3.10 wt % |
| Ex. 26 | L | 30 | 520 | 220 | 70 | 85 | SiO2 | 49.5 | HtoL | 0.58 | 3.10 wt % |
| Ex. 27 | L | 30 | 520 | 220 | 90 | 100 | Ag alloy | 33.9 | HtoL | 0.79 | 3.55 wt % |
| Ex. 28 | L | 30 | 520 | 220 | 90 | 100 | ZnS—SiO2 | 47.9 | — | — | 3.55 wt % |
| Ex. 29 | L | 30 | 520 | 220 | 90 | 100 | SiO2 | 44.2 | HtoL | 0.55 | 3.55 wt % |
| Compar. Ex. 1 | G | 120 | 410 | 330 | 30 | 70 | Ag alloy | 9.0 | — | — | 1.90 wt % |
| Compar. Ex. 2 | G | 120 | 410 | 330 | 30 | 70 | SiO2 | 6.5 | — | — | 1.90 wt % |

TABLE 1-continued

| recording portion | groove depth (nm) | L width (nm) | G width (nm) | L film thickness (nm) | G film thickness (nm) | buffer layer | reflectance | polarity | Max. signal amplitude | recording Layer coating conditions (dye concentration; wt %) |
|---|---|---|---|---|---|---|---|---|---|---|
| Ex. 2 | | | | | | | | | | |
| Compar. Ex. 3 | G | 160 | 430 | 310 | 20 | 75 | Ag alloy | 12.9 | — | — | 1.90 wt % |
| Compar. Ex. 4 | G | 160 | 430 | 310 | 20 | 75 | SiO2 | 19.9 | — | — | 1.90 wt % |

Example 1

In Example 1, on the second substrate, a guide groove was formed to have a groove depth of 65 nm (corresponding to approximately λ/10), a groove width (G width) of 320 nm and a land width (L width) of 420 nm.

The buffer layer was formed by spattering an Ag alloy. A metal complex azo dye having a dye concentration of 3.55 wt % as a coating condition was spin-coated to form the second recording layer.

The film thickness (thick film portion, G film thickness) of the groove portion of the second recording layer formed as above was 85 nm, and the film thickness (thin film portion, L film thickness) of the land portion was 70 nm.

The reflectance at the groove portion of the optical recording medium prepared as above was measured under the above conditions. The reflectance was 30.7%, as shown in Table 1.

The polarity and the maximum signal amplitude of the recorded signals were measured. The polarity of the recorded signals was H to L, and the maximum signal amplitude thereof was smaller than 0.1 (when recorded at a recording power of 15 nW), as shown in Table 1. However, since the maximum signal amplitude can be improved by adjusting the film thickness and the like of the recording layer, it is considered that an optical recording medium as this is usable.

Example 2

In Example 2, the reflectance at the land portion of an optical recording medium prepared in the same manner as the above Example 1 was measured under the above conditions. As a result, the reflectance was 40.0%, as shown in Table 1.

The polarity and the maximum signal amplitude of the recorded signals were measured. As shown in Table 1, the polarity of the recoded signals was H to L, and the maximum signal amplitude of the same was 0.79.

As above, it was found that reflectance necessary for recording/reading can be obtained in the land recording instead of the groove recording.

It was found that, even in an optical recording medium prepared in the same manner as Example 1, characteristics necessary for recording/reading can be obtained when the land recording is performed like Example 2.

Example 3

In Example 3, the reflectance was measured in the same manner as the above Example 2 excepting that the material of the buffer layer was SiO$_2$. The reflectance was 28.1%, as shown in Table 1.

It was found that reflectance necessary for recording/reading can be obtained even when the material of the buffer layer is changed from an Ag alloy to SiO$_2$.

Example 4

In Example 4, the reflectance was measured in the same manner as the above Example 2 excepting that the dye concentration as being the coating condition was 4.43 Wt %, whereby the film thickness (thick film portion, G film thickness) of the groove portion of the second recording layer was 100 nm, and the film thickness (thin film portion, L film thickness) of the land portion of the same was 80 nm (namely, a difference in film thickness between the thick film portion and the thin film portion of the second recording layer was 20 nm). The reflectance was 27.4%, as shown in Table 1.

As this, it was found that reflectance necessary for recording/reading can be obtained even when the film thickness of the second recording layer is varied.

Example 5

In Example 5, the reflectance was measured in the same manner as the above Example 4 excepting that the material of the buffer layer was ZnS—SiO$_2$. The reflectance was 26.7%, as shown in Table 1.

As this, it was found that reflectance necessary for recording/reading can be obtained even when the material of the buffer layer is changed from an Ag alloy to ZnS—SiO$_2$.

Example 6

In Example 6, the reflectance was measured in the same manner as the above Example 3 excepting that the dye concentration as being the coating condition was 4.43 wt %, whereby the film thickness (thick film portion, G film thickness) of the groove portion of the second recording layer was 100 nm, and the film thickness (thin film portion, L film thickness) of the land portion of the same was 80 nm (namely, a difference in film thickness between the thick film portion and the thin film portion of the second recording layer was 20 nm). The reflectance was 29.7%, as shown in Table 1.

As this, it was found that reflectance necessary for recording/reading can be obtained even when the film thickness of the second recording layer is varied.

(Example 7

In Example 7, the guide groove was formed on the second substrate to have the groove depth of 50 nm (corresponding to approximately λ/13), the groove width (G width) of 410 nm, and the land width (L width) of 330 nm.

An Ag alloy was spattered to form the buffer layer. A metal complex azo dye having a dye concentration of 3.55 wt % as the coating condition was spin-coated to form the second recording layer.

The film thickness (thick film portion, G film thickness) of the groove portion of the second recording layer prepared as this was 105 nm, and the film thickness (thin film portion, L film thickness) of the land portion of the same was 75 nm.

The reflectance at the groove portion of an optical recording medium prepared as this was measured under the above conditions. The reflectance was 40.1%, as shown in Table 1.

As this, it was found that the reflectance increases as the depth of the groove on the second substrate decreases, as compared with the above Example 1.

Example 8

In Example 8, the reflectance was measure in the same manner as the above Example 7 excepting that the material of the buffer layer was $SiO_2$. The reflectance was 30.9%, as shown in Table 1.

The polarity and the maximum signal amplitude of recorded signals were measured. The polarity of the recorded signals was H to L, and the maximum signal amplitude of the same was 0.36. Since the maximum signal amplitude can be improved by adjusting the film thickness and the like of the recording layer, it is considered that an optical recording medium as this is usable.

As this, it was found that reflectance necessary for recording/reading can be obtained even when the material of the buffer layer is changed from an Ag alloy to $SiO_2$.

Example 9

In Example 9, the reflectance was measured in the same manner as the above Example 7 excepting that the dye concentration as being the coating condition was 4.43 wt %, whereby the film thickness (thick film portion, G film thickness) of the groove portion of the second recording layer recording was 130 nm, and the film thickness (thin film portion, L film thickness) of the land portion of the same was 95 nm (namely, a difference in film thickness between the thick film portion and the thin film portion of the second recording layer was 35 nm). The reflectance was 29.1%, as shown in Table 1.

The polarity and the maximum signal amplitude of recorded signals were measured. The polarity of the recorded signals was H to L, and the maximum signal amplitude of the same was LS (failing to record due to poor sensitivity; when recording at a recording power of 15 mW). However, since the maximum signal amplitude can be improved by adjusting the film thickness and the like of the recording layer, it is considered that an optical recording medium as this is usable.

It was found that reflectance necessary for recording/reading can be obtained even when the film thickness of the second recording layer is vaired.

Example 10

In Example 10, the reflectance was measured in the same manner as the above Example 9 excepting that the material of the buffer layer was $ZnS—SiO_2$. The reflectance was 31.3%, as shown in Table 1.

The polarity and the maximum signal amplitude of recorded signals were measured. The polarity of the recorded signals was H to L, and the maximum signal amplitude of the same was 0.31, as shown in Table 1. However, since the maximum signal amplitude can be improved by adjusting the film thickness and the like of the recording layer, it is considered that an optical recording medium as this is usable.

It was found that reflectance necessary for recording/reading can be obtained even when the material of the buffer layer is changed from an Ag alloy to $ZnS—SiO_2$.

Example 11

In Example 11, the reflectance was measured in the same manner as the above Example 8 excepting that the dye concentration as being the coating condition was 4.43 wt %, whereby the film thickness (thick film portion, G film thickness) of the groove portion of the second recording layer was 100 nm, and the film thickness (thin film portion, L film thickness) of the land portion of the same was 80 nm (that is, a difference in film thickness between the thick film portion and the thin film portion of the second recording layer was 20 nm). The reflectance was 31.2%, as shown in Table 1.

The polarity and the maximum signal amplitude of recorded signals were measured. The polarity of the recorded signals was H to L, and the maximum signal amplitude of the same was 0.3, as shown in Table 1. However, since the maximum signal amplitude can be improved by adjusting the film thickness and the like of the recording layer, it is considered that an optical recording medium as this is usable.

It was found that reflectance necessary for recording/reading can be obtained even when the film thickness of the second recording layer is varied.

Example 12

In Example 12, the reflectance at the land portion of an optical recording medium prepared in the same manner as the above Example 7 was measured under the above conditions. As a result, the reflectance was 45.3%, as shown in Table 1.

It was found that reflectance necessary for recording/reading can be obtained even when the groove recording is changed to the land recording.

Example 13

In Example 13, the reflectance was measured in the same manner as the above Example 12 excepting that the material of the buffer layer was $ZnS—SiO_2$. The reflectance was 29.0%, as shown in Table 1.

It was found that reflectance necessary for recording/reading can be obtained even when the material of the buffer layer is changed from an Ag alloy to $ZnS—SiO_2$.

Example 14

In Example 14, the reflectance at the land portion of an optical recording medium prepared in the same manner as the above Example 8 was measured under the above conditions. As a result, the reflectance was 36.4%, as shown in Table 1.

The polarity and the maximum signal amplitude of recorded signals were measured. The polarity of the recorded signals was H to L, and the maximum signal amplitude of the same was 0.74, as shown in Table 1.

It was found that reflectance necessary for recording/reading can be obtained even when the groove recording is changed to the land recording.

It was also found that excellent recording/reading characteristics can be obtained even when the material of the buffer layer is SiO$_2$, and the film thickness and groove shape of the second recording layer are varied.

Even in an optical recording medium prepared in the same manner, characteristics necessary for recording/reading cannot be obtained when groove recording is performed like Example 8. To the contrary, it was found that the characteristics necessary for recording/reading can be obtained when the land recording is performed like this Example 14.

Example 15

In Example 15, the reflectance at the land portion of an optical recording medium prepared in the same manner as the above Example 9 was measured. As a result, the reflectance was 31.1%, as shown in Table 1.

The polarity and the maximum signal amplitude of recorded signals were measured. The polarity of the recorded signals was H to L, and the maximum signal amplitude of the same was 0.71, as shown in Table 1.

It was found that reflectance necessary for recording/reading can be obtained even when the groove recording is changed to the land recording.

It was also found that excellent recording/reading characteristics can be obtained even when the material of the buffer layer is changed from SiO$_2$ to an Ag alloy, and the film thickness of the second recording layer is varied.

Even in an optical recording medium prepared in the same manner, characteristics necessary for recording/reading cannot be obtained when the groove recording is performed like Example 9. To the contrary, it was found that characteristics necessary for recoding/reading can be obtained when the land recording is performed like this Example 15.

Example 16

In Example 16, the reflectance at the land portion of an optical recording medium prepared in the same manner as the above Example 10 was measured under the above conditions. As a result, the reflectance was 38.2%, as shown in Table 1.

The polarity and the maximum signal amplitude of recorded signals were measured. The polarity of the recorded signals was H to L, and the maximum signal amplitude of the same was 0.66, as shown in Table 1.

It was found that reflectance necessary for recording/reading can be obtained even when the groove recording is changed to the land recording.

It was also found that excellent recording/reading characteristics can be obtained even when the material of the buffer layer is changed from an Ag alloy to ZnS—SiO$_2$.

Even in an optical recording medium prepared in the same manner, characteristics necessary for recording/reading cannot be obtained when the groove recording is performed like Example 10. To the contrary, it was found that the characteristics necessary for recording/reading can be obtained when the land recording is performed like this Example 16.

Example 17

In Example 17, the reflectance at the land portion of an optical recording medium prepared in the same manner as the above Example 11 was measured under the above conditions. As a result, the reflectance was 36.1%, as shown in Table 1.

The polarity and the maximum signal amplitude of recorded signals were measured. The polarity of the recorded signals was H to L, and the maximum signal amplitude of the same was 0.73, as shown in Table 1.

It was found that reflectance necessary for recording/reading can be obtained even when the groove recording is changed to the land recording.

It was also found that excellent recording/reading characteristics can be obtained even when the material of the buffer layer is changed from an Ag alloy to SiO$_2$.

Even in an optical recording medium prepared in the same manner, characteristics necessary for recording/reading cannot be obtained when the groove recording is performed like Example 11. To the contrary, it was found that the characteristics necessary for recording/reading can be obtained when the land recording is performed like this Example 17.

Example 18

In Example 18, on the second substrate, a guide groove was formed to have a groove depth of 30 nm (corresponding to approximately λ/20), a groove width (G width) of 220 nm and a land width (L width) of 520 nm.

An Ag alloy was spattered to form the buffer layer. A metal complex azo dye having a dye concentration of 3.10 wt % as being a coating condition was spin-coated to form the second recording layer.

The film thickness (thick film portion, G film thickness) of the groove portion of the second recording layer formed as this was 110 nm, and the film thickness (thin film portion, L film thickness) of the land portion of the same was 70 nm.

The reflectance at the groove portion of the optical recording medium prepared as above was measured under the above conditions. The reflectance was 43.0%, as shown in Table 1.

It was found that the reflectance increases as the groove depth on the second substrate decreases, as compared with the above Example 7.

Example 19

In Example 19, the reflectance was measured in the same manner as the above Example 18 excepting that the material of the buffer layer was ZnS—SiO$_2$. The reflectance was 39.0%, as shown in Table 1.

The polarity and the maximum signal amplitude of recorded signals were measured. The polarity of the recorded signals was H to L, and the maximum signal amplitude of the same was 0.22, as shown in Table 1. However, since the maximum signal amplitude can be improved by adjusting the film thickness and the like of the recording layer, it is considered that an optical recording medium like this is usable.

It was found that reflectance necessary for recording/reading can be obtained even when the material of the buffer layer is changed from an Ag alloy to ZnS—SiO$_2$.

Example 20

In Example 20, the reflectance was measured in the same manner as the above Example 18 excepting that the material of the buffer layer was SiO$_2$. The reflectance was 43.2%, as shown in Table 1.

The polarity and the maximum signal amplitude of recorded signals were measured. The polarity of the recorded signals was H to L, and the maximum signal amplitude of the same was 0.11, as shown in Table 1. However, since the maximum signal amplitude can be improved by adjusting the film thickness and the like of the recording layer, it is considered that an optical recording medium like this is usable.

It was found that reflectance necessary for recording/reading can be obtained even when the material of the buffer layer is changed from an Ag alloy to SiO$_2$.

Example 21

In Example 21, the reflectance was measured in the same manner as the above Example 18 excepting that the dye concentration as being the coating condition was 3.55 wt %, whereby the film thickness (thick film portion, G film thickness) of the groove portion of the second recording layer was 135 nm, and the film thickness (thin film portion, L film thickness) of the land portion of the same was 90 nm (that is, a difference in film thickness between the thick film portion and the thin film portion of the second recording layer was 45 nm). The reflectance was 30.2%, as shown in Table 1.

The polarity and the maximum signal amplitude of recorded signals were measured. The polarity of the recorded signals was H to L, and the maximum signal amplitude of the same was a little smaller than 0.1 (when performing the recording at a recording power of 15 mW). However, since the maximum signal amplitude can be improved by adjusting the film thickness and the like of the recording layer, it is considered that an optical recording medium like this is usable.

It was found that reflectance necessary for recording/reading can be obtained even when the film thickness of the second recording layer is varied.

Example 22

In Example 22, the reflectance was measured in the same manner as the above Example 21 excepting that the material of the buffer layer was $ZnS$—$SiO_2$. The reflectance was 41.7%, as shown in Table 1.

It was found that reflectance necessary for recording/reading can be obtained even when the material of the buffer layer is changed from an Ag alloy to $ZnS$—$SiO_2$.

Example 23

In Example 23, the reflectance was measured in the same manner as the above Example 20 excepting that the dye concentration as being the coating condition was 3.55 wt %, whereby the film thickness (thick film portion, G film thickness) of the groove portion of the second recording layer was 135 nm, and the film thickness (thin film portion, L film portion) of the land portion of the same was 90 nm (that is, a difference in film thickness between the thick film portion and the thin film portion was 45 nm). The reflectance was 38.9%, as shown in Table 1.

The polarity and the maximum signal amplitude of recorded signals were measured. The polarity of the recorded signals was H to L, and the maximum signal amplitude of the same was 0.17, as shown in Table 1. However, since the maximum signal amplitude can be improved by adjusting the film thickness and the like of the recording layer, it is considered that an optical recording medium like this is usable.

It was found that reflectance necessary for recording/reading can be obtained even when the film thickness of the second recording layer is varied.

Example 24

In Example 24, the reflectance at the land portion of an optical recording medium prepared in the same manner as the above Example 18 was measured under the above conditions. The reflectance was 49.1%, as shown in Table 1.

It was found that reflectance necessary for recording/reading can be obtained even when the groove recording is changed to the land recording.

Example 25

In Example 25, the reflectance at the land portion of an optical recording medium prepared in the same manner as the above Example 19 was measured under the above conditions. The reflectance was 43.9%, as shown in Table 1.

The polarity and the maximum signal amplitude of recorded signals were measured. The polarity of the recorded signals was H to L, and the maximum signal amplitude of the same was 0.72, as shown in Table 1.

It was found that reflectance necessary for recording/reading can be obtained even when the material of the buffer layer is changed from an Ag alloy to $ZnS$—$SiO_2$.

It was also found that more excellent recording/reading characteristics can be obtained when the film thickness, the groove width and the land width of the second recording layer are changed in the case of a $ZnS$—$SiO_2$ buffer layer.

Even in an optical recording medium prepared in the same manner, characteristics necessary for recording/reading cannot be obtained when the groove recording is performed like Example 19. To the contrary, it was found that the characteristics necessary for recording/reading can be obtained when the land recording is performed like this Example 25.

Example 26

In Example 26, the reflectance at the land portion of an optical recording medium prepared in the same manner as the above Example 20 was measured under the above conditions. The reflectance was 49.5%, as shown in Table 1.

The polarity and the maximum signal amplitude of recorded signals were measured. The polarity of the recorded signals was H to L, and the maximum signal amplitude of the same was 0.58, as shown in Table 1.

It was found that reflectance necessary for recording/reading can be obtained even when the groove recording is changed to the land recording.

It was also found that when the material of the buffer layer is changed from $ZnS$—$SiO_2$ to $SiO_2$, the maximum signal amplitude is slightly deteriorated although the reflectance is improved. However, it was found that the characteristics necessary for recording/reading can be obtained.

Even in an optical recording medium prepared in the same manner, characteristics necessary for recording/reading cannot be obtained when the groove recording is performed like Example 20. To the contrary, it was found that the characteristics necessary for recording/reading can be obtained when the land recording is performed like this Example 26.

Example 27

In Example 27, the reflectance at the land portion of an optical recording medium prepared in the same manner as the above Example 21 was measured under the above conditions. The reflectance was 33.9%, as shown in Table 1.

The polarity and the maximum signal amplitude of recorded signals were measured. The polarity of the recorded signals was H to L, and the maximum signal amplitude of the same was 0.79, as shown in Table 1.

It was found that reflectance necessary for recording/reading can be obtained even when the groove recording is changed to the land recording.

It was also found that when the material of the buffer layer is changed from $ZnS$—$SiO_2$ to an Ag alloy and the film thickness of the second recording layer is varied, the maximum signal amplitude is improved and the characteristics necessary for recording/reading can be obtained although the reflectance is slightly deteriorated.

Even in an optical recording medium prepared in the same manner, characteristics necessary for recording/reading cannot be obtained when the groove recording is performed like Example 21. To the contrary, it was found that the characteristics necessary for recording/reading can be obtained when the land recording is performed like this Example 27.

Example 28

In Example 28, the reflectance at the land portion of an optical recording medium prepared in the same manner as the above Example 22 was measured under the above conditions. The reflectance was 47.9%, as shown in Table 1.

It was found that reflectance necessary for recording/reading can be obtained even when the groove recording is changed to the land recording.

Example 29

In Example 29, the reflectance at the land portion of an optical recording medium prepared in the same manner as the above Example 23 was measured under the above conditions. The reflectance was 44.2%, as shown in Table 1.

The polarity and the maximum signal amplitude of recorded signals were measured. The polarity of the recorded signals was H to L, and the maximum signal amplitude of the same was 0.55, as shown in Table 1.

It was found that reflectance necessary for recording/reading can be obtained even when the groove recording is changed to the land recording.

It was also found that when the material of the buffer layer is changed from an Ag alloy to $SiO_2$, the reflectance is improved and the characteristics necessary for recording/reading can be obtained although the maximum signal amplitude is slightly deteriorated.

Even in an optical recording medium prepared in the same manner, characteristics necessary for recording/reading cannot be contained when the groove recording is performed like Example 23. To the contrary, it was found that when the land recording is performed like this Example 29, the characteristics necessary for recording/reading can be obtained.

Comparative Example 1

In Comparative Example 1, on the second substrate, a guide groove was formed to have a groove depth of 120 nm (corresponding to approximately $\lambda/5.5$), a groove width (G width) of 330 nm and a land width (L width) of 410 nm.

An Ag alloy was spattered to form the buffer layer. A metal complex azo dye having a concentration of 1.90 wt % as the coating condition was spin-coated to form the second recording layer.

The film thickness (thick film portion, G film thickness) of the groove portion of the second recording layer formed as this was 70 nm, and the film thickness (thin film portion, L film thickness) of the land portion of the same was 30 nm.

The reflectance at the groove portion of an optical recording medium prepared as above was measured under the above conditions. The reflectance was 9.0%, as shown in Table 1.

It was found that when the depth of the groove on the second substrate is large, reflectance necessary for recording/reading cannot be obtained, as compared with the above examples.

Comparative Example 2

In Comparative Example 2, the reflectance was measured in the same manner as the above Comparative Example 1 excepting that the material of the buffer layer was $SiO_2$. The reflectance was 6.5%, as shown in Table 1.

It was found that reflectance necessary for recording/reading cannot be obtained even when the material of the buffer layer is changed from an Ag alloy to $SiO_2$.

Comparative Example 3

In Comparative Example 3, on the second substrate, a guide groove was formed to have a groove width of 160 nm (corresponding to approximately $\lambda/4$), a groove width (G width) of 310 nm and a land width (L width) of 430 nm.

An Ag alloy was spattered to form the buffer layer. A metal complex azo dye having a dye concentration of 1.90 wt % as the coating condition was spin-coated to form the second recording layer.

The film thickness (thick film portion, G film thickness) of the groove portion of the second recording layer formed as above was 75 nm, and the film thickness (thin film portion, L film thickness) of the land portion of the same was 20 nm.

The reflectance at the groove portion of an optical recording medium prepared as above was measured under the above conditions. The reflectance was 12.9%, as shown in Table 1.

It was found that when the depth of the groove on the second substrate is increased, reflectance necessary for recording/reading cannot be obtained although the reflectance increases, as compared with the above Comparative Example 1.

Comparative Example 4

In Comparative Example 4, the reflectance was measured in the same manner as the above Comparative Example 3 excepting that the material of the buffer layer was $SiO_2$. The reflectance was 19.9%, as shown in Table 1.

It was found that even when the material of the buffer layer is changed from an Ag alloy to $SiO_2$, reflectance necessary for recording/reading cannot be obtained although the reflectance increases.

CONCLUSION

It was found that when the depth of the groove on the second substrate is, for example, 120 nm or 160 nm like the above Comparative Examples 1 through 4, reflectance necessary to record or read information in or from the second dye containing recording layer positioning farther from a side from which the light beam comes in cannot be obtained. To the contrary, it was found that when the depth of the groove on the second substrate is decreased to, for example, not greater than 65 nm like the above Examples 1 through 29, reflectance necessary to record or read information in or from the second dye containing recording layer positioning farther from the side from which the light beam comes in can be obtaining in both the land recording and the groove recording.

It was found that, in the above Examples 1, 8 through 11, 19 through 21 and 23, recording/reading characteristics (polarity, maximum signal amplitude) necessary to record or read information in or from the second dye containing recording layer positioning farther from the side from which the light beam comes in are difficult to be obtained in the groove recording. To the contrary, it was found that, in the above Examples 2, 14 through 17, 25 through 27 and 29, the recording/reading characteristics (polarity, maximum signal amplitude) necessary to record or read information in or from the second dye containing recording layer positioning farther from the side from which the light beam comes in can be obtained in the land recording.

In each of the above examples, a groove-less substrate without the recording layer and the semitransparent reflective layer was used as the first information recording body in order to eliminate an effect of the first information recording body and evaluate the characteristics of the second recording layer as accurately as possible. However, use of a general first information recording body does not largely exert an effect on the evaluation on the second recording layer.

In the media used in Examples 1 through 29, sufficient reflectance, which is the most important requirement for recording/reading, can be obtained. It is considered that an optical recording media having other excellent recording/reading characteristics can be obtained by suitably selecting a structure other than the groove depth.

In Examples 2, 14 through 17, 25 through 27 and 29, it is considered that optical recording media having other excellent recording/reading characteristics can be obtained by suitably selecting a structure other than the recording layer film thickness.

This application is based on Japanese Patent Application Number 2003-109486 filed on Apr. 14, 2003, and Japanese Patent Application No. 2003-110579 filed on Apr. 15, 2003, the whole contents of which are hereby incorporated by reference.

We claim:

1. An optical recording medium comprising a first information recording body formed by laminating at least a first dye containing recording layer containing a first dye and a semitransparent reflective layer in this order on a first substrate having a guide groove and a second information recording body formed by laminating at least a reflective layer and a second dye containing recording layer containing a second dye in this order on a second substrate having a guide groove, said optical recording medium being formed by bonding together said first information recording body and said second information recording body through an optically transparent adhesive layer, with opposite sides to said substrates of said first information recording body and said second information recording body facing to each other, in which information is recorded or read by irradiating a light beam from said first substrate's side;

wherein said second dye containing recording layer has a thick film portion and a thin film portion, and said light beam is irradiated to said thin film portion of said second dye containing recording layer to record or read information in or from said thin film portion.

2. The optical recording medium according to claim 1, wherein said first dye containing recording layer has a thick film portion and a thin film portion, and said light beam is irradiated to said thick film portion of said first dye containing recording layer to record or read information in or from said thick film portion.

* * * * *